(12) United States Patent
Nair et al.

(10) Patent No.: US 12,084,558 B2
(45) Date of Patent: *Sep. 10, 2024

(54) AQUEOUS FUNCTIONAL COMPOSITION FOR ARTICLES

(71) Applicant: Eastman Kodak Company, Rochester, NY (US)

(72) Inventors: Mridula Nair, Penfield, NY (US); Ellen M. Pyszczek, LeRoy, NY (US)

(73) Assignee: EASTMAN KODAC COMPANY, Rochester, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 17/713,346

(22) Filed: Apr. 5, 2022

(65) Prior Publication Data

US 2022/0227956 A1 Jul. 21, 2022

Related U.S. Application Data

(63) Continuation-in-part of application No. 16/907,393, filed on Jun. 22, 2020, now Pat. No. 11,370,924.

(51) Int. Cl.
| | |
|---|---|
| *C08J 3/03* | (2006.01) |
| *C08J 3/24* | (2006.01) |
| *C08J 9/00* | (2006.01) |
| *C08J 9/36* | (2006.01) |

(52) U.S. Cl.
CPC ............... *C08J 9/365* (2013.01); *C08J 3/03* (2013.01); *C08J 3/24* (2013.01); *C08J 9/0066* (2013.01); C08J 2201/026 (2013.01); C08J 2205/052 (2013.01)

(58) Field of Classification Search
None
See application file for complete search history.

(56) References Cited

U.S. PATENT DOCUMENTS

| | | |
|---|---|---|
| 3,607,341 A | 9/1971 | Goins et al. |
| 3,713,868 A | 1/1973 | Gordon et al. |
| 4,137,380 A | 1/1979 | Gunning et al. |
| 4,439,473 A | 3/1984 | Lippman |
| 4,457,980 A | 7/1984 | Daniels et al. |
| 4,677,016 A | 6/1987 | Ferziger et al. |
| 4,931,356 A | 6/1990 | Misevich et al. |
| 5,134,017 A | 7/1992 | Baldwin et al. |
| 5,741,582 A | 4/1998 | Leaderman et al. |
| 7,754,409 B2 | 7/2010 | Nair et al. |
| 7,887,984 B2 | 2/2011 | Nair et al. |
| 8,252,414 B2 | 8/2012 | Putnam et al. |
| 8,329,783 B2 | 12/2012 | Nair et al. |
| 9,469,738 B1 | 10/2016 | Nair et al. |
| 9,891,350 B2 | 2/2018 | Lofftus et al. |
| 9,963,569 B2 | 5/2018 | Nair et al. |
| 10,696,814 B2 * | 6/2020 | Nair ............... D06N 3/0061 |
| 11,807,731 B2 * | 11/2023 | Nair ............... D06N 3/0068 |
| 2004/0192835 A1 | 9/2004 | Steidl et al. |
| 2012/0053260 A1 | 3/2012 | Balk et al. |
| 2012/0129974 A1 | 5/2012 | DeNotta et al. |
| 2012/0167666 A1 | 7/2012 | Nair et al. |
| 2012/0225228 A1 | 9/2012 | Barth et al. |
| 2015/0093512 A1 | 4/2015 | Brunner et al. |
| 2015/0234098 A1 * | 8/2015 | Lofftus ............... G02B 5/003 |
| | | 428/313.5 |
| 2016/0354804 A1 * | 12/2016 | Brick ............... C08J 9/0004 |
| 2018/0051155 A1 | 2/2018 | Nair et al. |
| 2018/0094112 A1 | 4/2018 | Nair et al. |
| 2018/0327964 A1 | 11/2018 | Nair et al. |
| 2019/0390027 A1 | 12/2019 | Nair et al. |
| 2019/0390028 A1 | 12/2019 | Lobo et al. |
| 2019/0390029 A1 | 12/2019 | Nair et al. |

FOREIGN PATENT DOCUMENTS

| | | |
|---|---|---|
| CN | 107 663 024 A | 2/2018 |
| EP | 1380616 A1 | 1/2004 |
| EP | 3354481 A1 | 8/2018 |
| WO | 2013/138158 A1 | 9/2013 |
| WO | 2018/034860 | 2/2018 |
| WO | 2020/005528 A1 | 1/2020 |

* cited by examiner

Primary Examiner — David P Turocy
(74) Attorney, Agent, or Firm — J. Lanny Tucker

(57) ABSTRACT

An aqueous non-foamed functional composition formulation is disposed on a foamed opacifying layer in light-blocking, foamed opacifying elements. This non-foamed functional composition formulation has 0.5-15% solids and essential (i) and (iv) components and optional (ii), (v), (vi), and (vii) components. The components (i) untreated synthetic silica (fumed silica or precipitated silica) at 0.5-10 weight %; and a (iv) water-soluble or water-dispersible organic polymeric binder having a glass transition temperature ($T_g$) below 25° C. The weight ratio of the (i) untreated synthetic silica to the (iv) water-soluble or water-dispersible organic polymeric binder is 10:1 to 1:1. The optional components include: a (ii) solid or non-solid lubricant; a (v) crosslinking agent; a (vi) thickener; and a (vii) coating aid. Glass particles can also be present. The presence of the (i) untreated synthetic silica provides improved brightness, e.g. an L* value of at least 80, and uniform coatings in the resulting, foamed opacifying element.

18 Claims, No Drawings

AQUEOUS FUNCTIONAL COMPOSITION FOR ARTICLES

RELATED APPLICATIONS

This is a Continuation-in-part of U.S. Pat. No. 11,370,924, which is a Continuation-in-part of commonly assigned U.S. Ser. No. 16/018,332 filed Jun. 26, 2018, now U.S. Pat. No. 10,731,022, the disclosure of which is incorporated herein by reference.

Reference is also made to the following commonly assigned patent applications and patents:

U.S. Pat. No. 10,920,032, by Nair, Lobo, Sedita, and Rollinson;

U.S. Pat. No. 11,377,567, by Nair and Swanton;

U.S. Publication No. 2020/0216632, by Nair, Lloyd, Garman, and Shifley;

U.S. Pat. No. 10,696,813, by Lobo, Nair, and Donovan; and

U.S. Pat. No. 10,696,814, by Nair, Lobo, and Donovan; the disclosures of all of which are incorporated herein by reference.

FIELD OF THE INVENTION

This invention relates to a method for providing opacifying articles by using an aqueous functional composition formulation that can be applied to a foamed opacifying layer. Such opacifying articles can be used as shades, curtains, and other articles used to block excessive ambient light. The resulting functional composition in the opacifying article can serve a variety of functions because of the incorporation therein of an untreated synthetic silica such as precipitated silica and fumed silica.

BACKGROUND OF THE INVENTION

In general, when light strikes a surface, some of it may be reflected, some absorbed, some scattered, and the rest transmitted. Reflection can be diffuse, such as light reflecting off a rough surface such as a white wall, in all directions, or specular, as in light reflecting off a mirror at a definite angle. An opaque substance transmits almost no light, and therefore reflects, scatters, or absorbs all of it. Both mirrors and carbon black are opaque. Opacity depends on the frequency of the light being considered. "Blackout" or light blocking materials typically refer to coated layers in articles that are substantially impermeable to light such as visible or UV radiation. Thus, when a blackout material such as a blackout curtain or shade is hung over a window, it generally blocks substantially all external light from entering the room through that window. Blackout materials are suitable as curtains and shades for domestic use, for institutional use in hospitals and nursing homes, as well as for use in commercial establishments such as hotels, movie theaters, and aircraft windows where the option of excluding light can be desirable.

Light blocking articles such as the blackout curtains or shades can be comprised of a fabric (porous) substrate coated with more than one layer of a foamed latex composition. There is a desire for these curtains, in addition to blocking transmitted light, to have a light color (hue) facing the environment where an activity needs illumination in order to minimize the amount of artificial lighting needed to perform the activity. An example is when the function of the blackout material is to separate two areas of activity where one or both areas can be artificially lit at the same time. More often than not, the function of a blackout curtain is to prevent sunlight from entering a room through a building window. It can also be desirable for the color (hue) of the side facing the window to match the external décor of the building.

Fabrics are typically porous materials and are derived from yarns of manmade or naturally occurring threads that are woven or knitted together. Threads used to make yarn are often twisted together to form the threads. Synthetic plastic coating materials, such as polyvinyl chloride, led to the emergence of fabrics woven from plastic coated yarns. Such fabrics have increased durability and wear properties compared to fabrics made from naturally occurring fibers. One use for such fabrics is window shades especially for commercial and hospital sites.

Light colored blackout curtains theoretically can be made by coating porous fabrics with light colored foams containing light scattering pigments such as titanium dioxide or clays. However, very thick foam coatings will be needed to create blackout curtains through which the sun is not visible in a darkened room using only these pigments. A method that is practiced for reducing the weight of such blackout materials is to sandwich a light-absorbing, foamed black or grey pigment, such as a carbon black layer between two foamed light scattering, white pigment-containing layers.

When an electromagnetic radiation blocking coating has, as it often does, a strongly light absorbing material containing black pigments such as carbon black, between two reflective layers, it has at least two distinct problems. First, such coatings require three or more separate coating operations that reduce manufacturing productivity and increase unit costs. Secondly, carbon black in the light absorbing middle layer can become "fugitive" (or non-enclosed) from some puncture or tear occurring during sewing or laundering, and soil other layers such as the reflective layers, which is highly objectionable. Additionally, the stitches generated in the materials during sewing can cause the fugitive carbon from the light absorbing layer to spread over a larger area thereby increasing the area of objectionable shading of the light-colored surface.

U.S. Pat. No. 7,754,409 (Nair et al.), U.S. Pat. No. 7,887,984 (Nair et al.), U.S. Pat. No. 8,252,414 (Putnam et al.), and U.S. Pat. No. 8,329,783 (Nair et al.) describe porous polymer particles that are made by a multiple emulsion process, wherein the multiple emulsion process provides formation of individual porous particles comprising a continuous polymer phase and multiple discrete internal pores, and such individual porous particles are dispersed in an external aqueous phase. The described Evaporative Limited Coalescence (ELC) process is used to control the particle size and distribution while a hydrocolloid is incorporated to stabilize the inner emulsion of the multiple emulsion that provides the template for generating the pores in the porous particles.

U.S. Pat. No. 9,891,350 (Lofftus et al.) describes improved articles that are designed with an opacifying layer that is capable of blocking predetermined electromagnetic radiation. The opacifying layer is disposed on a substrate that can be composed of any suitable material and an underlying layer can be incorporated between the substrate and the opacifying layer. While these articles have numerous advantages, and represent an important advance in the art, there is a need for further improvement in providing opacifying articles that are lighter in weight; and that have improved flexibility, good "hand," while maintaining light coloration of the surfaces facing an observer without losing reflectivity, and light-absorptive properties; launderability;

and minimizing dark opacifying agents getting out into the environment upon stitching and handling.

An improvement in this art is provided by the foamed aqueous compositions described in U.S. Pat. No. 9,469,738 (Nair et al.) in which very small amounts of opacifying colorants incorporated into porous particles can be incorporated into a latex foam, and the resulting composition has a foam density of at least 0.1 g/cm$^3$.

U.S. Pat. No. 9,963,569 (Nair et al) describes a method for providing a foamed, opacifying element includes providing a foamable aqueous latex composition comprising porous particles incorporating within them very small amounts of opacifying colorants, aerating it to a specific foam density, applying the foamed aqueous latex composition to a porous substrate, drying, and densifying the dried layer.

U.S. Pat. No. 4,677,016 (Ferziger) describes a foam-coated, tightly woven fiberglass fabric where at least one surface thereof is coated with one or more layers of a flame retardant foamed latex coating composition. At least one of the foam coating layers is opaque and comprises a cured layer of flame retardant polymeric latex foam.

The opacifying elements described in U.S. Patent Application Publications 2019/0390027 (Nair et al.), 2019/0390028 (Lobo et al.), and 2019/0390029 (Nair et al.) have a functional layer disposed over an opacifying layer that is coated on one side of a fabric. The primary purposes of the functional layer are to prevent "blocking": i) when a fabric with an opacifying layer is in prolonged physical contact with another opacifying layer deposited on another fabric with each other and to prevent sticking of these layers when they are separated; and ii) when the article of the fabric with the opacifying layer is subjected to the conditions of a thermal dye transfer process and the opacifying layer is under contact with a surface under high temperature and pressure during the transfer process to enable easy separation from the surface. The functional layer compositions incorporated into these opacifying elements can contain various (i) spacer particles to achieve the advantages noted above.

In U.S. Patent Application Publication 2019/0390028 (noted above), the functional composition can also be used to whiten the color or hue of the surface of the light-blocking, opacifying layer by the incorporation of an appropriate amount of a white pigment such as titanium dioxide, barium sulfate, or calcium carbonate as (i) spacer particles. However, while such (i) spacer particles may include titanium dioxide or silica of undefined types, it has been found that the use of titanium dioxide usually leads to dispersion problems given the high density of the material and undesirably high levels are needed to get the desired whiteness. Uniformity of the resulting coating can also be challenging with the use of such (i) spacer particles. Further, it is not clear from that teaching how just any type of unspecified silica used as a (i) spacer particle in the functional composition can offer additional features such as whiteness.

Thus, there is a continued need to improve the functional composition formulation, for example to render the resulting functional composition whiter in appearance and as a more uniform coating.

SUMMARY OF THE INVENTION

The present invention provides a method for preparing a foamed, opacifying element, the method comprising following steps A) through F), in order, unless otherwise indicated:

A) providing a substrate having a first opposing side and a second opposing side;

B) applying a foamed aqueous opacifying composition having a foam density of at least 0.1 g/cm$^3$ and up to and including 0.5 g/cm$^3$, onto the first opposing side of the substrate;

C) drying the applied foamed aqueous opacifying composition, to provide a foamed opacifying layer;

D) densifying the foamed opacifying layer to reduce its thickness by at least 20% by volume;

E) applying a non-foamed functional composition formulation to the foamed opacifying layer; and F) curing the applied non-foamed functional composition formulation and the foamed opacifying layer to provide a non-foamed functional composition on the foamed opacifying layer, thereby providing a foamed, opacifying element having and L* value of at least 80, and having the foamed opacifying layer as the only opacifying layer and the non-foamed functional composition as the outermost composition on the first opposing side of the substrate, wherein:

the foamed opacifying layer comprises:

(a) at least 0.1 weight % and up to and including 35 weight % of porous particles, each porous particle comprising a continuous polymeric phase and discrete pores dispersed within the continuous polymeric phase, the porous particles having a mode particle size of at least 2 µm and up to and including 50 µm;

(b') at least 10 weight % and up to and including 80 weight % of a matrix material that is derived from a (b) binder material having a glass transition temperature ($T_g$) of less than 25° C.;

(c) at least 0.0001 weight % and up to and including 50 weight % of one or more additives selected from the group consisting of dispersants, foaming agents, foam stabilizing agents, plasticizers, flame retardants, optical brighteners, thickeners, biocides, and tinting colorants;

(d) less than 5 weight % of water; and (e) at least 0.002 weight % of an opacifying colorant different from all of the one or more additives of (c), which opacifying colorant absorbs electromagnetic radiation having a wavelength of at least 380 nm and up to and including 800 nm, all amounts being based on the total weight of the foamed opacifying layer; and the non-foamed functional composition formulation is a non-foamed aqueous dispersion having at least 1% solids and up to and including 15% solids, and comprises the following essential (i) and (iv) components and any of the optional (ii), (v), (vi), and (vii) components:

(i) untreated synthetic silica in an amount of at least 0.5 weight % and up to and including 10 weight %, based on the total weight of the non-foamed functional composition formulation;

a (ii) solid or non-solid lubricant;

one or more (iv) water-soluble or water-dispersible organic polymeric binders, each having a glass transition temperature ($T_g$) below 25° C.;

a (v) crosslinking agent if it is needed to crosslink the water-soluble or water-dispersible organic polymeric binder;

a (vi) thickener; and a (vii) coating aid having a hydrophilic-lipophilic balance number of at least 5, wherein the weight ratio of the (i) untreated synthetic silica to the one or more (iv) water-soluble or water-dispersible organic polymeric binders, is at least 10:1 to and including 1:1.

This invention also provides a non-foamed functional composition formulation that is an aqueous dispersion having at least 0.5% solids and up to and including 15% solids, and comprises the following essential (i) and (iv) components, water, and any of the optional (ii), (v), (vi), and (vii) components:

(i) an untreated synthetic silica that is a precipitated silica, or is a mixture of precipitated silica and fumed silica, in a total amount of at least 0.5 weight % and up to and including 10 weight %, based on the total weight of the non-foamed functional composition formulation;

a (ii) solid or non-solid lubricant;

one or more (iv) water-soluble or water-dispersible organic polymeric binders, each having a glass transition temperature ($T_g$) below 25° C.;

a (v) crosslinking agent if it is needed to crosslink the water-soluble or water-dispersible organic polymeric binder;

a (vi) thickener; and a (vii) coating aid having a hydrophilic-lipophilic balance number of at least 5, and optionally, glass particles, wherein the weight ratio of the (i) precipitated silica to the one or more (iv) water-soluble or water-dispersible organic polymeric binders, is at least 10:1 and up to and including 1:1.

The present invention provides aqueous functional compositions that can be incorporated into foamed, opacifying elements such as window shades, curtains, and other light-blocking materials that contain low amounts of opacifying colorants in a light-blocking, foamed opacifying layer. The foamed, opacifying elements prepared using the present invention have a functional composition disposed over the light-blocking, foamed opacifying layer to provide unique surface properties and to provide desired whiteness appearance.

Applying a non-foamed functional composition formulation onto the foamed, opacifying layer to provide the desired shade of whiteness in a separate step from the creation of the foamed opacifying layer, provides the freedom to apply the minimum possible laydown without having to burden the layer below, meaning that fewer materials must be added to the foamed opacifying layer. Further, it offers a degree of freedom and efficiency to concentrate the functionality onto the surface where it is most needed such as for whiteness and to prevent blocking.

It was discovered that the use of an untreated synthetic silica such as fumed silica or precipitated silica in the functional composition provides a desired uniform, white, and mottle free appearance. For example, an L* value of at least 80 can be achieved for the resulting opacifying element. It has also been found that when titanium dioxide is used for this purpose, high levels are needed to get the comparable appearance, and this causes serious dispersion and settling problems during application of the coating given the high density of titanium dioxide in the composition. The appearance of a coating containing titanium dioxide is also nonuniform and has a mottled appearance. Uniformity and whiteness were also compromised and less desirable than when forms of silica, such as colloidal silica and other inorganic pigments such as alumina, were used in place of silica fumed or precipitated silica. Thus, it appears that only an untreated synthetic silica such as fumed silica or precipitated silica solves the problems noted above to meet the expectations of this invention and it was unexpected that this happened because similar materials did not solve these problems.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described for any specific embodiment.

Definitions

As used herein to define various components of the foamed aqueous composition, foamable aqueous composition, non-foamed functional composition formulations, or materials used to prepare the porous particles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered as approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "foamed, opacifying element," "light-blocking element," and "element" are intended to be synonymous terms referring to the same article.

Unless otherwise indicated, the terms "foamed aqueous composition" and "foamed composition" are intended to be synonymous terms and to refer to the same material and, are different from a "non-foamed functional composition" and "non-foamed functional composition formulation" as described below.

The terms (a) "porous particle" and (a) "porous particles" are used herein, unless otherwise indicated, to refer to porous organic polymeric materials useful in the foamable aqueous compositions, foamed aqueous compositions, and foamed, opacifying elements. The (a) porous particles generally comprise a solid continuous polymeric phase having an external particle surface and discrete pores dispersed within the continuous polymeric phase. The continuous polymeric phase also can be chemically crosslinked or elastomeric in nature, or both chemically crosslinked and elastomeric in nature.

The continuous polymeric phase of the (a) porous particles generally has the same composition throughout that solid phase. That is, the continuous polymeric phase is generally uniform in composition including any materials

[for example, (e) opacifying colorant] that can be incorporated therein. In addition, if mixtures of organic polymers are used in the continuous polymeric phase, generally those mixtures also are dispersed uniformly throughout.

As used in this disclosure, the term "isolated from each other" refers to the different (discrete) pores of same or different sizes that are separated from each other by some material of the continuous polymeric phase, and such pores are not interconnected. Thus, "discrete" pores refer to "individual" or "closed," non-connected pores or voids distributed within the continuous polymeric phase.

When used herein, the terms "first discrete pore" and "second discrete pore" refer to distinct sets of individual pores in the (a) porous particles. Each distinct set of pores includes a plurality of discrete pores, each of which discrete pores is isolated from others discrete pores in the distinct set of pores, and the discrete pores of each distinct set of pores are isolated from all other discrete pores of the other distinct sets of pores in the (a) porous particles. Each distinct set of pores can have the same mode average size or both sets can have the same mode average size. For making such (a) porous particles, the word "discrete" can also be used to define different droplets of the first and second aqueous phases when they are suspended in the oil (solvent) phase (described below).

Where there are different sets of discrete pores, the discrete pores of a first set can be predominantly nearer then external particle surface compared to the discrete pores of a second set. For example, a set of smaller discrete pores can be predominantly close to the external particle surface compared to a set of larger discrete pores. As used herein, the term "predominant" means that a larger number fraction of discrete pores of one size is found in a "shell" area nearer the surface of the (a) porous particle than one would expect based on the total number fraction of the two or more types (sizes) of discrete pores present in the (a) porous particle.

The (a) porous particles can include "micro," "meso," and "macro" discrete pores, which according to the International Union of Pure and Applied Chemistry, are the classifications recommended for discrete pore sizes of less than 2 nm, from 2 nm to 50 nm, and greater than 50 nm, respectively. Thus, while the (a) porous particles can include discrete pores of all sizes and shapes (that is, discrete pores entirely within the continuous polymeric phase) providing a suitable volume in each discrete pore, macro discrete pores are particularly useful. While there can be open macro pores on the surface of the porous particle, such open pores are not desirable and are present only by accident. The size of the (a) porous particles, their formulation, and manufacturing conditions are the primary controlling factors for discrete pore size. However, typically the discrete pores independently have an average size of at least 100 nm and up to and including 7,000 nm, or more likely at least 200 nm and up to and including 2,000 nm. Whatever the size of the discrete pores, they are generally distributed randomly throughout the continuous polymeric phase. If desired, the discrete pores can be grouped predominantly in one part (for example, "core" or "shell") of the (a) porous particles.

The (a) porous particles used in this invention generally have a porosity of at least 20 volume % and up to and including 70 volume %, or likely at least 35 volume % and up to and including 65 volume %, or more typically at least 40 volume % and up to an including 60 volume %, all based on the total porous particle volume. Porosity can be measured by a modification of the known mercury intrusion procedure.

Where this feature is mentioned, glass transition temperatures of organic polymers used in the practice of the present invention, can be measured using Differential Scanning calorimetry (DSC) using known procedures. For many commercially available organic materials, the glass transition temperatures are known from the suppliers.

Polymer viscosity (in centipoise or mPa-sec) comprising the continuous polymeric phase can be measured in ethyl acetate at concentration of 20 weight % of the polymer at 25° C. in an Anton Parr MCR 301 stress rheometer in a coquette using steady shear sweeps. Shear rate at 100 sec$^{-1}$ was calculated from the resulting graphical plot of viscosity vs. shear rate.

CIELAB L*, a*, and b* values described herein have the known definitions according to CIE 1976 color space or later known standard versions of color space and were calculated using the power distribution function for a standard D65 illuminant and the 10° Standard Observer function. These calculated values can be used to express a color as three numerical color values: L* for the lightness (or brightness) of the color, a* for the green-red component of the color, and b* for the blue-yellow component of the color.

Unless otherwise indicated herein, the terms "first opposing surface" and "second opposing surface" refer to the opposing surfaces of the substrate (described below) used to form a foamed, opacifying element according to the present invention. The terms "first outer surface" and "second outer surface" refer to the opposing outer surfaces of a foamed, opacifying element formed according to the present invention.

Uses

The foamable aqueous compositions, foamed aqueous compositions, and non-foamed functional composition formulations described herein can be used to prepare foamed, opacifying elements that in turn can be useful as radiation ("light") blocking materials or blackout materials for various environments and structures. The foamed, opacifying elements can also exhibit improved sound and heat blocking properties. The foamed, opacifying elements exhibit blackout or light-blocking properties and can optionally have a printable outer surface capable of being embossed or accepting ink used in screen printing, gravure printing, inkjet printing, thermal imaging (such as "dye sublimation thermal transfer"), or other imaging processes. Thus, one can provide embossable or printable surfaces in such foamed, opacifying elements so that the printed image on one outer surface is generally not observable from the other outer surface. The non-foamed functional composition described for use in this invention containing the fumed silica provides desired "whiteness" or opacity with an L* value of at least 80 in the resulting foamed, opacifying element.

Foamable Aqueous Compositions

The foamable aqueous compositions described herein can be suitably aerated (or "foamed") to provide foamed aqueous compositions, for example to prepare a foamed, opacifying element according to the present invention as described below. In many embodiments, each foamable aqueous compositions used in the present invention have five essential components, that is, only five components are needed to obtain the properties of the foamed opacifying layer in a foamed, opacifying element described herein: (a) porous particles as described below; (b) a binder material (that is transformed into (b') matrix material), also described below; (c) one or more additives as described below, for example comprising at least one surfactant; (d) water; and (e) an opacifying colorant that is a different material from all of the (c) one or more additives. This opacifying colorant is chosen to absorb electromagnetic radiation generally in the UV and visible regions of the electromagnetic spectrum, for example, wavelengths of at least 250 nm and up to and including 800 nm or of at least 350 nm and up to and including 700 nm.

The foamable aqueous composition generally has at least 35% and up to and including 70% solids, or more particularly at least 40% and up to and including 60% solids.

(a) Porous Particles:

Porous particles used in the present invention containing discrete pores (or compartments or voids) are used in the foamed opacifying layers and they are generally prepared using one or more water-in-oil emulsions in combination with an aqueous suspension process, such as in the Evaporative Limited Coalescence (ELC) process that is known in the art. The details for the preparation of the (a) porous particles are provided, for example, in U.S. Pat. No. 8,110,628 (Nair et al.), 8,703,834 (Nair), 7,754,409 (Nair et al.), 7,887,984 (Nair et al.), 8,329,783 (Nair et al.), and 8,252,414 (Putnam et al.), the disclosures of all of which are incorporated herein by reference. Thus, the (a) porous particles are generally polymeric and organic in nature (that is, the continuous polymeric phase is polymeric and organic in nature) and non-porous particles (having less than 5% porosity) are excluded from use in the present invention. Inorganic particles can be present on the outer surface as noted below.

The (a) porous particles are composed of a continuous polymeric phase derived from one or more organic polymers that are chosen so that the continuous polymeric phase has a glass transition temperature ($T_g$) of greater than 80° C., or more typically of at least 100° C. and up to and including 180° C., or more likely at least 110° C. and up to and including 170° C. as determined as described above (using DSC). Polymers having a $T_g$ that is greater than 200° C. are typically less useful in the continuous polymeric phase.

In addition, the continuous polymeric phase can comprise one or more organic polymers, each of which has a viscosity of at least 80 centipoises (80 mPa-sec) and up to and including 500 centipoises (500 mPa-sec) at a shear rate of 100 sec$^{-1}$ as measured in ethyl acetate at a concentration of 20 weight % at 25° C.

For example, the continuous polymeric phase can comprise one or more organic polymers having the properties noted above, wherein generally at least 70 weight % and up to and including 100 weight % based on the total polymer weight in the continuous polymeric phase, is composed of one or more cellulose polymers (or cellulosic polymers) including but not limited to, those cellulosic polymers derived from one or more (for example, a combination) of cellulose acetate, cellulose butyrate, cellulose acetate butyrate, and cellulose acetate propionate. A polymer derived solely from cellulose acetate butyrate is particularly useful. Mixtures of these cellulose polymers can also be used if desired, and mixtures comprising a polymer derived from cellulose acetate butyrate as at least 80 weight % of the total of cellulose polymers (or of all polymers in the continuous polymeric phase) are particularly useful mixtures.

In general, the (a) porous particles used in the present invention have a mode particle size equal to or less than 50 μm, or of at least 2 μm and up to and including 50 μm, or typically of at least 3 μm and up to and including 30 μm or even up to and including 40 μm. Most useful (a) porous particles have a mode particle size of at least 3 μm and up to and including 20 μm. Mode particle size represents the most frequently occurring diameter for spherical particles and the most frequently occurring largest diameter for the non-spherical particles in a particle size distribution histogram, which can be determined using known equipment (including light scattering equipment such as the Sysmex FPIA 3000 Flow Particle Image Analyzer that used image analysis measurements and that can be obtained from various sources including Malvern Panalytical; and coulter counters and other particle characterizing equipment available from Beckman Coulter Diagnostics), software, and procedures.

Pore stabilizing materials such as hydrocolloids can be present within at least part of the volume of the discrete pores distributed throughout the continuous polymeric phase, which pore stabilizing materials are described in the Nair, Nair et al., and Putnam et al. patents cited above. In some embodiments, the same pore stabilizing material is incorporated in essentially all the discrete pores throughout the entire (a) porous particles. The pore stabilizing hydrocolloids can be selected from the group consisting of carboxymethyl cellulose (CMC), a gelatin or gelatin derivative, a protein or protein derivative, polyvinyl alcohol and its derivatives, a hydrophilic synthetic polymer, and a water-soluble microgel.

It can be desired in some embodiments to provide additional stability of one or more discrete pores in the (a) porous particles during their formation, by having one or more amphiphilic block copolymers disposed at the interface of the one or more discrete pores and the continuous polymeric phase. Such materials are "low HLB," meaning that they have an HLB (hydrophilic-lipophilic balance) value as it is calculated using known science, of 6 or less, or even 5 or less. The details of these amphiphilic polymers and their use in the preparation of the (a) porous particles are provided in U.S. Pat. No. 9,029,431 (Nair et al.), the disclosure of which is incorporated herein by reference.

A particularly useful amphiphilic block copolymer useful in such embodiments comprises poly(ethylene oxide) and poly(caprolactone) that can be represented as PEO-b-PCL. Amphiphilic block copolymers, graft copolymers and random graft copolymers containing similar components are also useful.

Such an amphiphilic block copolymer can be generally present in the (a) porous particles in an amount of at least 1 weight % and up to and including 99.5 weight %, or at least 2 weight % and up to and including 50 weight %, based on total porous particle dry weight.

The (a) porous particles used in this invention can be spherical or non-spherical depending upon the desired use. In a method used to prepare the (a) porous particles, additives (shape control agents) can be incorporated into the first or second aqueous phases, or in the oil (organic) phase to modify the shape, aspect ratio, or morphology of the (a) porous particles. The shape control agents can be added prior to or after forming the water-in-oil-in-water emulsion. In either case, the interface at the oil and second water phase is modified before organic solvent is removed, resulting in a reduction in sphericity of the (a) porous particles. The porous particles can also comprise surface stabilizing agents, such as colloidal silica, on the outer surface of each (a) porous particle, in an amount of at least 0.1 weight %, based on the total dry weight of the (a) porous particle.

The average size of the discrete pores in the (a) porous particles is described above.

The (a) porous particles can be provided as powders, or as aqueous suspensions (including water or water with water-miscible organic solvents such as alcohols). Such powders and aqueous suspensions can also include surfactants or suspending agents to keep the porous particles suspended or for rewetting them in an aqueous medium. A useful surfactant for this purpose, for example, is a $C_{12}$-$C_{14}$ secondary alcohol derivative of poly(ethylene oxide) that can be commercially available as TERGITOL® 15-S-7 (Dow Chemical Corporation). The other compositional features are described in the incorporated description of methods for preparing the (a) porous particles.

The (a) porous particles are generally present in the foamable aqueous composition in an amount of at least 0.05 weight % and up to and including 20 weight %, or typically at least 0.5 weight % and up to and including 15 weight %, based on the total weight of the foamable aqueous composition (including all solvents that are present), particularly when the (a) porous particles have a mode size of at least 3 µm and up to and including 20 µm.

Optimal foamed opacifying layers designed according to the present invention comprise: (a) porous particles containing a small amount of an (e) opacifying colorant as described below to enhance the light blocking capacity of the (a) porous particles (particularly transmitted light blocking capacity); a (b') matrix material derived from a (b) binder material to hold the (a) porous particles in place; and (c) surfactants and other additives including optionally one or more tinting colorants that can be in other (a) porous particles or dispersed within the layer. The foamed aqueous composition used to prepare the foamed opacifying layer comprises foam cells that surround the (a) porous particles.

Upon drying the foamed aqueous composition, the large mismatch in refractive index between the discrete pores of the (a) porous particles in the foamed opacifying layer and the polymer walls (continuous polymeric phase), and the dried foam cells, causes incident electromagnetic radiation passing through the foamed opacifying layer to be scattered by the multiplicity of interfaces and discrete pores. The back scattered electromagnetic radiation can again be scattered and returned in the direction of the incident electromagnetic radiation thus reducing the attenuation and contributing to the opacifying power and brightness or luminous reflectance of the foamed opacifying layer. If a small amount of (e) opacifying colorant is present in the (a) porous particles of the foamed opacifying layer, for example either in the discrete pores or in the continuous polymer phase of the (a) porous particles, the opacifying power of the foamed opacifying layer is increased. This is because the multiple scattering of electromagnetic radiation in the foamed opacifying layer increases the path length of the electromagnetic radiation through the opacifying layer, thereby increasing the chance that the electromagnetic radiation will encounter the opacifying colorant in the foamed opacifying layer and be blocked or absorbed by it.

A single foamed opacifying layer is present in embodiments according to the present invention comprises (a) porous particles and a relatively low amount of an (e) opacifying colorant such as carbon black for creating light-blocking coatings and the dry foam cells surrounded by the (b') matrix material. Multiple light scattering effects by and among the (a) porous particles and the surrounding dry foam cells, increase the path of the electromagnetic radiation through the foamed opacifying layer. The likelihood of electromagnetic radiation encountering an (e) opacifying colorant is increased by this greater path length. A single foamed opacifying layer is used in the present invention as opposed to multiple foamed layers having a foamed black opacifying layer and foamed white layers on either side of it, that are used in a multi-layer package in prior art opacifying elements. This single foamed opacifying layer, along with the non-foamed functional composition disposed thereon, provide all of the desired functional advantages so that the use of multiple foamed opacifying and other foamed layers and their attendant problems can be avoided.

(b) Binder Materials:

The foamable and foamed aqueous compositions used in the present also comprises one or more (b) binder materials from which a binding (b') matrix material can be formed to hold the (a) porous particles, (c) additives, and (e) opacifying colorants together in a foamed opacifying layer.

It is particularly useful that the (b) binder material have the following properties: it is water-soluble or water-dispersible; it is capable of forming a stable foamed aqueous composition with the essential and optional components described herein; it is capable of being disposed onto a suitable substrate as described below; it does not inhibit the aeration (foaming) process (described below); it is capable of being dried and where desired also crosslinked (or cured); it has good light and heat stability; and it is film-forming but upon curing, it contributes to the flexibility of the foamed, opacifying element and is thus not too brittle, for example having a $T_g$ of less than 25° C. as determined using Differential Scanning calorimetry.

The choice of (b) binder material can also be used to increase the cleanability of the resulting foamed opacifying compositions in the foamed, opacifying elements. The (b) binder material can be used to provide the (b') matrix material that adds to a supple feel to touch and flexibility especially when disposed on a porous substrate (for example, a fabric) that is meant for window coverings such as draperies.

The (b) binder material can include one or more organic polymers that are film forming and that can be provided as an emulsion, dispersion, or an aqueous solution, and that cumulatively provide the properties noted above. It can also include polymers that are self-crosslinking or self-curable, or it can include one or more polymers to which crosslinking agents are added and are thus curable or capable of being crosslinked (or cured) under appropriate conditions.

Thus, if the (b) binder material is crosslinkable (or curable) in the presence of a suitable crosslinking agent or catalyst, such crosslinking (or curing) can be activated chemically with heat, radiation, or other known means. A curing or crosslinking process serves to provide improved insolubility of the resulting dry foamed composition and well as cohesive strength and adhesion to the porous substrate. The curing or crosslinking agent is generally a chemical having functional groups capable of reacting with reactive sites in a (b) binder material (such as a functionalized latex polymer) under curing conditions to thereby produce a crosslinked structure. Representative crosslinking agents include but are not limited to, multi-functional aziridines, aldehydes, methylol derivatives, and epoxides.

Useful (b) binder materials include but are not limited, to poly(vinyl alcohol), poly(vinyl pyrrolidone), ethylene oxide polymers, polyurethanes, urethane-acrylic copolymers, other acrylic polymers, styrene polymers, styrene-acrylic copolymers, vinyl polymers, vinyl-acrylic polymers, styrene-butadiene copolymers, acrylonitrile copolymers, polyesters, silicone polymers, or a combination of two or more of these organic polymers. Such binder materials are readily available from various commercial sources or can be prepared using known starting materials and synthetic conditions. The binder material can be anionic, cationic or nonionic in net charge. A useful class of film-forming (b) binder materials includes aqueous latex polymer dispersions such as acrylic latexes (including acrylic copolymers) that can be ionic or nonionic colloidal dispersions of acrylate polymers and copolymers. For example, useful film-forming aqueous latexes include but are not limited to, styrene-butadiene latexes, poly(vinyl chloride) and poly(vinylidene chloride) latexes, poly(vinyl pyridine) latexes, poly(acrylonitrile) latexes, poly(vinyl chloride)-acrylic copolymers, and latexes formed from N-methylol acrylamide, butyl acrylate, and ethyl acrylate.

The (b) binder material generally has a glass transition temperature that is less than 25° C., more likely equal to or less than −10° C., or even equal to or less than −25° C. Glass transition temperature for these materials can be determined using known procedures such as Differential Scanning calorimetry as described above. The (b) binder material desirably has adequate flexibility and tensile strength in order to maintain integrity upon handling.

The one or more (b) binder materials can be present in the foamable aqueous composition in an amount of at least 15 weight %, or at least 20 weight % and up to and including 70 weight %, or typically at least 30 weight % and up to and including 50 weight %, based on the total foamable aqueous composition (that is, the total weight of all components including all solvents).

(c) Additives:

The foamable aqueous compositions can include at least 0.0001, or at least 0.001 weight %, or even at least 0.01 weight %, and up to and including 2 weight %, or up to and including 5 weight %, or even up to and including 20 weight %, or even at least and including 30 weight % of one or more (c) additives, or more likely of (c) two or more additives, and typically such (c) two or more additives can comprise at least one foaming agent (or foaming surfactant) and at least one foam stabilizing agent as defined below. These amounts refer to the total of all the (c) additives in each foamable aqueous composition and are based on the total weight of those compositions (including water). There can be mixtures of each type of (c) additive, or mixtures of two or more types of (c) additives in each of the foamable aqueous compositions.

Any of these (c) additives or mixtures thereof, can be present within any location of the foamed aqueous composition, including but not limited to the continuous polymeric phase; a volume of the first set (or other set) of discrete pores; or both the first set (or other set) of discrete pores and the continuous polymeric phase of the (a) porous particles. Alternatively, the (c) additives can be present within the (b) binder material alone, or both within the (b) binder material and within the (a) porous particles.

In all embodiments, the (c) additives useful in the present invention are not the same compounds or do not have the same function as the (a) porous particles, (b) binder materials, and (e) opacifying colorants as described herein.

Useful (c) additives include but are not limited to plasticizers, inorganic or organic pigments and dyes (for example, pigment or dye colorants different from the opacifying colorants described below), flame retardants, biocides (including fungicides and antimicrobial agents), pH buffers, optical brighteners, tinting colorants, thickeners, and various surfactants, and inert inorganic or organic fillers (such as clays) that are not any of the other materials or opacifying colorants described below.

The "inert" inorganic or organic fillers are particles that can be added to reduce the use of more expensive (b) binder materials. Such fillers do not undergo a chemical reaction in the presence of water or other components in the foamable aqueous composition; nor do they absorb significant electromagnetic radiation like the (e) opacifying colorants. Useful inert organic or inorganic filler materials include but are not limited to titanium dioxide, talc, clay (for example, kaolin), magnesium hydroxides, aluminum hydroxides, dolomite, glass beads, silica, mica, glass fibers, nano-fillers, and calcium carbonate. Combinations of these materials can be used if desired. A clay, talc, calcium carbonate, or a mixture of any of these materials is particularly useful.

At least one (c) additive (and more likely at least two different additives) can be a surfactant that is defined as a compound that reduces surface tension. In most embodiments, at least one useful surfactant is a foaming agent (or foaming surfactant) that functions to create and enhance foam formation. In many embodiments, the (c) additives comprise one or more foaming agents (foaming surfactants) as well as one or more foam stabilizing agents that are also surface-active agents that function to structure and stabilize the foam.

Representative examples of useful foaming agents (foaming surfactants) include but are not limited to the following compounds: alkyl betaines, amine oxides (amphoteric), lauryl sulfate salts, cetyl sulfate salts, sulfosuccinate ester salts, ammonium sulfosuccinate, disodium stearyl sulfosuccinate, diammonium n-octadecyl sulfosuccinamate, sulfosuccinamides, ethoxylated alcohols, ionic, nonionic or anionic agents such as fatty acid soaps or a fatty acid condensation product with an alkylene oxide (for example, the condensation product of ethylene oxide with lauryl or oleic acid or an ester of fatty alcohols), the ammonium salt of a C12 to C15 alkanol sulfate containing ethyleneoxide, ammonium ethoxy sulfate, ammonium polyethyleneoxy sulfate, alkyl phenols with 8 to 12 carbons in the alcohol group and 12 to 20 ethyleneoxy units, ammonium decylphenoxy poly(ethyleneoxy) sulfate, C11 to C15 linear secondary alcohols with 12 to 20 ethyleneoxy units, ethylene oxide adducts of linear primary alcohols with 10 to 16 carbons in the alcohol moiety, ammonium salt of a C11 to C15 secondary alkanol sulfate containing ethyleneoxide, calcium 2,4-didodecylphenoxy-poly(ethyleneoxy) sulfate, sodium salt of 2-ethyl-2-methyl-4-undecanol sulfate, ammonium dinonylphenoxy-poly(ethyleneoxy) sulfate, sodium salt of 2-ethyl-hexanol sulfate, ethylamine salt of pentadecyl-poly(ethyleneoxy)sulfate, butyl-amine salt of dodecyl-polyoxyethylene sulfate, ethoxyamine salt of octyl-polyoxyethylene sulfate, hexylamine salt of nonylphenoxy-polyethyleneoxysulfate, the corresponding alkali metal, ammonium and amine salts, fatty acid alkanolamides, tertiary alkylamines quarternized with benzene sulfonic acid, amphoteric glycine derivatives, and similar materials.

Useful foam stabilizing agents include but are not limited to the following compounds: ammonium stearate, potassium stearate, ammonium oleate, and ammonium ricinoleate.

Many of the above-mentioned foaming and foam stabilizing agents can be obtained from various commercial sources. Mixtures of foaming agents (or foaming surfactants) and mixtures of foam stabilizers can be used if desired.

The relative amounts of each of these two types of (c) additives is not critical if the desired function is evident, that is suitable foaming properties as required to prepare the foamed aqueous composition, and stability of the foamed aqueous composition during storage and manufacture of the foamed, opacifying elements. The optimal amounts of each of these (c) additives can be determined by using routine experimentation.

Useful biocides (microbial or antifungal agents) that can be present as (c) additives include but are not limited to, sulfosuccinamides; silver metal (for example, silver particles, platelets, or fibrous strands); and silver-containing compounds such as silver chelates and silver salts such as silver sulfate, silver nitrate, silver chloride, silver bromide, silver iodide, silver iodate, silver bromate, silver tungstate, silver phosphate, and silver carboxylates. In addition, copper metal (for example, copper particles, platelets, or fibrous strands) and copper-containing compounds such as copper chelates and copper salts can be present as (c) additives for biocidal purposes. Mixtures of any of silver metal, silver-containing compounds, copper metal, and copper-containing compounds, can also be present and used in this manner.

It can also be useful to include thickeners as (c) additives to modify the viscosity of the foamable aqueous composition and to stabilize it if aeration is not inhibited. A skilled worker can optimize the viscosity to obtain optimal aeration conditions and desired foam density as described below. Useful thickeners can be utilized to control the rheology of the foamable aqueous composition depending upon the method used to form the foamed opacifying layer on a substrate as described below. Particularly useful rheology modifiers are RHEOVIS® PU 1214 (BASF), ACRYSOL® G111 (Dow Chemical Company), and Paragum (Royal Adhesives, Inc.).

Useful (c) additives can comprise one or more tinting colorants that can be suitable dyes or pigments (or combinations) and can be used to provide a specific observable color, coloration, or hue in the resulting foamed, opacifying elements. These materials are not chosen to provide the opacifying property described below for the (e) opacifying colorants and thus, tinting colorants are intended to be different materials than the (e) opacifying colorants. Mixtures of tinting colorants can be present in the foamable aqueous compositions and they can be different in composition and amount from each other. The desired coloration or hue can be obtained using specific tinting colorants can be used in combination with (e) opacifying colorant(s) described below to offset or modify the original color of a foamed, opacifying element (without such materials) to provide more whiteness (or brightness or increased L*) in the final "color" (or coloration). The one or more tinting colorants can be incorporated within the (a) porous particles (either within the volume of discrete pores, within the continuous polymeric phase, or in both places), or they can be uniformly dispersed within the (b) binder material. In some embodiments, a tinting colorant can be incorporated within the same (a) porous particles that also include an (e) opacifying colorant (as described below). Alternatively, one or more tinting colorants can be present within both the (a) porous particles (in a suitable location) and within the (b) binder material.

The one or more tinting colorants can be present in the foamable aqueous composition in an amount of at least 0.0001 weight %, or more typically at least 0.001 weight % and up to and including 3 weight %, based on the total weight of the foamable aqueous composition (including all solvents). Tinting colorants can be dyes or organic pigments that are soluble or dispersible in organic solvents and polymers that are used for making the (a) porous particles and thus can be included within the oil phase used to prepare such (a) porous particles. Alternatively, the tinting colorants can be primarily water-soluble or water-dispersible materials that are included into an aqueous phase used to prepare the (a) porous particles or they can be added directly to the foamable aqueous composition. Such tinting colorants are not meant to provide any significant opacity to the single foamed opacifying layer but only to add a desired color or tint to that layer.

The (c) additives can comprise two or more materials selected from, for example, a surfactant that is a foaming agent (or foaming surfactant), a foam stabilizing agent, thickener, a flame retardant, and a biocide.

(d) Aqueous Medium:

Water is the primary solvent used in an (d) aqueous medium in the foamable aqueous compositions according to the present invention. By "primary" is meant that of the total weight of solvents, water comprises at least 75 weight %, and more likely at least 80 weight % and up to and including 100 weight % of the total solvent weight. Auxiliary solvents that can be present must not adversely affect or harm the other components in the composition, namely the (a) porous particles, (b) binder materials, (c) one or more additives, and (e) opacifying agents. Nor must such auxiliary solvents adversely affect formation of the foamable aqueous composition or its use to prepare a foamed, opacifying element. Such auxiliary solvents can be water-miscible organic solvents such as alcohols and ketones.

The (d) aqueous medium then, which is primarily water, comprises at least 30 weight % and up to and including 65 weight %, or typically at least 40 weight % and up to and including 60 weight %, of the total weight of the foamable aqueous composition.

(e) Opacifying Colorants:

The (e) opacifying colorants used in the present invention can be a single material or chosen from any suitable combination of materials such that the single or multiple materials absorb UV and visible electromagnetic radiation (defined above) to provide blackout properties (or suitable opacity). (e) Opacifying colorants can be soluble dyes or pigments or combinations of each or both types of materials. The (e) opacifying colorants are different compositional and functionally from the compounds defined above as the (c) additives.

In most embodiments, the one or more (e) opacifying colorants are present within a volume of the first set (or another set) of discrete pores within the (a) porous particles, within the continuous polymeric binder of the (a) porous particles, or within both the volume of the first set (or another set) of discrete pores and the continuous polymeric binder of the (a) porous particles. This is highly advantageous as the (a) porous particles can be used to "encapsulate" various (e) opacifying colorants as well as tinting colorants or other (c) additives so they are kept isolated from the other components of the foamable aqueous composition and are additionally not exposed to the environment during sewing or upon surface damage of the foamed, opacifying element. However, in some embodiments, it can be useful to incorporate (e) opacifying colorants solely or additionally within the (b) binder material in which the (a) porous particles are dispersed.

As used herein, an (e) opacifying colorant can include one or more colorant materials that are chosen, individually or in combination, to provide the blocking or absorption of electromagnetic radiation (as described above). While the (e) opacifying colorant(s) can provide some coloration or desired hue, they are not purposely chosen for that purpose and are thus materials that are chosen to be different from the tinting colorants described above.

Examples of (e) opacifying colorants that can be used individually or in combination include but are not limited to, visually neutral (that is, no color as observed using the unaided human eye) or black pigments or dyes, a carbon black, black iron oxide, graphite, aniline black, anthraquinone black, and combinations of colored pigments or dyes such as combinations of two or more cyan, magenta, green, orange, blue, red, and violet dyes. Such opacifying colorants or combinations thereof are characterized by a complete absence of hue and chroma and as such they appear black or visually neutral in color to the unaided human eye. The present invention is not limited to only the specific opacifying colorants described herein but these are considered as representative and as suitable guidance for a skilled worker to choose other opacifying colorants for the desired purpose. A carbon black, a neutral or black pigment or dye (or combination thereof), or a combination of pigments or dyes other than carbon black, is particularly useful as an opacifying colorant, of which there are many types available from commercial sources. Combinations of dyes or pigments such as a combination of the subtractive primary-colored pigments (cyan, magenta, and yellow colored pigments) can also be used to provide a visually neutral (e) opacifying colorant.

The (e) opacifying colorant can be generally present in the foamable aqueous composition in an amount of at least 0.001 weight % and up to and including 0.5 weight %, or even at least 0.003 weight % and up to and including 0.2 weight %, all based on the total weight of the foamable aqueous composition (including the weight of all solvents). These amounts refer to the total amount of one or a mixture of (e) opacifying colorants.

In some embodiments, the (e) opacifying colorant is a carbon black that is present in an amount of at least 0.003 weight % and up to and including 0.2 weight %, based on the total weight of the foamable aqueous composition.

If the (e) opacifying colorants are in pigment form, they can be milled to a fine particle size using appropriate pigment dispersants, and then encapsulated within the volume of the discrete pores of the (a) porous particles by incorporating the milled pigment within an aqueous phase used in making the (a) porous particles. Preparation of milled solid particle dispersions can include combining the (e) opacifying colorant particles to be reduced in size with a dispersant and a liquid medium such as water or ethyl acetate [when the (e) opacifying colorant is incorporated in the continuous polymeric phase] in which the (a) porous particles are to be dispersed, in a suitable grinding mill in which the (a) porous particles are reduced in size and dispersed. The dispersant, an important ingredient in the milling, can be chosen to allow the (e) opacifying colorant particles to be milled in the liquid medium down to a size small enough for incorporation into the discrete pores of the porous particles. The dispersants can be selected to obtain efficient (e) opacifying colorant particle size reduction during milling, provide good colloidal stability of the (e) opacifying colorant particles to prevent agglomeration after milling and impart the desired properties of the final foamed aqueous composition containing the (e) opacifying colorants and the (a) porous particles containing them.

Alternatively, the (e) opacifying colorant can be incorporated within the continuous polymeric phase of the (a) porous particles by incorporating the (e) opacifying colorant in the oil phase used in making the porous particles. Such arrangements can be achieved during the manufacture of the (a) porous particles using the teaching provided herein and in references cited herein.

Foamed Aqueous Compositions

Foamed aqueous compositions can be prepared using the procedures described below wherein an inert gas (such as air) is mechanically incorporated into the foamable aqueous composition as described above, which procedures are designed to provide a foam density of at least 0.1 g/cm² and up to and including 0.5 g/cm³, or more likely of at least 0.15 g/cm³ and up to and including 0.4 g/cm³. Foam density can be determined gravimetrically by weighing a known volume of the foamed aqueous composition.

The resulting foamed aqueous composition according to this invention generally has at least 35% solids and up to and including 70% solids, or more particularly at least 40% solids and up to and including 60% solids.

Components (a) through (e) of the foamed aqueous composition are generally present in the same relative amounts as described for the foamable aqueous composition (described above) as the foaming process does not appreciably add to or diminish the relative amounts of such components.

For example, the (a) porous particles (as described above) can be present in the foamed aqueous composition in an amount of at least 0.05 weight % and up to and including 15 weight %, or typically of at least 0.5 weight % and up to and including 10 weight %, based on the total weight of the foamed aqueous composition (including all solvents).

One or more (b) binder materials (as described above) can be present in an amount of at least 15 weight %, or at least 20 weight % and up to and including 70 weight % or typically of at least 30 weight % and up to and including 50 weight %, based on the total weight of the foamed aqueous composition (including all solvents).

One or more (c) additives (or two or more different additives, as described above) can be present in an amount of at least 0.0001 weight % and up to and including 30 weight % or typically of at least 0.001 weight %, or even at least 0.01 weight %, and up to and including 20 weight %, based on the total weight of the foamed aqueous composition (including all solvents). At least one of the (c) additives can be a surfactant as described above, and the (c) additives can comprise a foaming agent (foaming surfactant) and a foam stabilizing agent. In some particularly useful embodiments of the foamed aqueous composition, the (c) additives comprise two or more materials selected from surfactant that is a foaming agent (foaming surfactant), a surfactant that is a foam dispersing agent, a flame retardant, and a biocide.

Water can also be present as the predominant solvent (at least 75 weight % of total solvent weight), and all the solvents in an (d) aqueous medium can be present in an amount of at least 30 weight % and up to and including 70 weight %, or typically at least 40 weight % and up to and including 60 weight %, based on the total weight of the foamed aqueous composition.

The (e) opacifying colorants (as described above) are generally present in any suitable amount to provide the desired appearance, coloration, and opacity in the resulting foamed, opacifying element, In many embodiments, the one or more (e) opacifying colorants can be present in an amount of at least 0.001 weight % or at least 0.001 weight % and up to and including 0.5 weight %, or even in an amount of at least 0.003 weight % and up to and including 0.2 weight %, especially when the (e) opacifying colorant is a carbon black, all weights based on the total weight of the foamed aqueous composition (including all solvents).

For example, an opacifying colorant can be a carbon black and present in an amount of at least 0.003 weight % and up to and including 0.2 weight % based on the total weight of the foamed aqueous composition. Such (e) opacifying colorant can be present in any desirable location as noted above.

Foamed, Opacifying Elements

Foamed, opacifying elements can be prepared using methods described below. Such articles comprise a substrate, a single foamed opacifying layer formed on the first opposing surface in a manner described below, and a functional composition disposed over (or directly on, in some embodiments) the foamed opacifying layer, for example as a functional layer, as described below. Each substrate useful herein generally has two opposing sides, for example, a first opposing surface (or side) and a second opposing surface (or side), which opposing surfaces are generally planar in form.

The foamed, opacifying elements prepared according to this invention are designed with a single foamed opacifying layer as the only foamed layer disposed directly on only one (such as the first) opposing surface of the substrate. In such cases, the single foamed opacifying layer and the non-foamed functional composition disposed thereon are the only essential layers or compositions in the foamed, opacifying element. This simplified structure has numerous advantages over the multi-layer structures known in the art where an opacifying colorant in a foamed layer is generally sandwiched between other foamed layers having various pigments or particulate fillers, such as described for example, in U.S. Pat. No. 4,677,016 (Ferziger et al.).

The foamed opacifying layer can be derived from a foamed aqueous composition described above, and comprises components (a) porous particles, (b') matrix material derived from (b) binder material, (c) one or more additives, (d) aqueous medium, and (e) opacifying colorant, all of which are described in more detail above.

Component (a) porous particles that are present in an amount of at least 0.1 weight % and up to and including 35 weight % or at least 0.5 weight % and up to and including 25 weight % are described in detail above, the amounts based on the total weight of the foamed opacifying layer. The (a) porous particles can have a mode particle size of at least 2 µm and up to and including 50 µm (or at least 3 µm and up to and including 30 µm, or more likely at least 3 µm and up to and including 20 µm) and a first set of discrete pores of the (a) porous particles can have an average pore size of at least 100 nm and up to and including 7,000 nm.

In addition, the foamed opacifying layer includes a (b') matrix material that is derived from a (b) binder material upon curing, which (b') matrix material is generally present in an amount of at least 10 weight % and up to and including 80 weight %, or at least 20 weight % and up to and including 60 weight %, based on the total weight of the foamed opacifying layer. Such (b') matrix materials are at least partially cured or crosslinked as described below and can be cured up to 100% of all potential curable or crosslinking sites in the (b) binder material.

One or more (c) additives (or two or more additives in some embodiments as described above) can be present in the foamed opacifying layer in an amount of at least 0.0001 weight % and up to and including 50 weight %, or at least 1 weight % and up to and including 45 weight %, such (c) one or more additives being selected from the group consisting of foaming agents, foam stabilizing agents, dispersants, plasticizers, inorganic or organic pigments and dyes (for example, pigment or dye colorants different from the opacifying colorants described below), flame retardants, biocides (such as antimicrobials and fungicides), pH buffers, surfactants, thickeners, and inert inorganic or organic fillers (such as clays and titanium dioxide) that are not any of the other materials or (e) opacifying colorants described herein, all of which (c) additives are described in more detail above. The amounts are based on the total weight of the opacifying layer. As noted above, preferred embodiments can include at least one surfactant that is a foaming agent and at least one foam stabilizing agent that may also be a surfactant in behavior.

Particularly useful (c) additives can comprise one or more materials selected from a foaming agent (foaming surfactant), a foam stabilizing agent, a flame retardant, and a biocide (such as an antimicrobial agent).

The foamed opacifying layer can comprise one or more tinting colorants as part of the (c) one or more additives, for example in the (a) porous particles, in an amount of at least 0.0001 weight % and up to and including 3 weight %, based on the total weight of the opacifying layer.

Unless otherwise noted, the term "foamed opacifying layer" used herein can also refer to a foamed and densified (and optionally cured) layer substantially in dry form, that contains less than 5 weight %, or even less than 2 weight %, of aqueous medium (including water and any auxiliary solvents), based on the total weight of the foamed opacifying composition. This amount does not include any water that may be present in the discrete pores of the (a) porous particles. The foamed opacifying layer generally comprises at least 90% solids, or at least 95% or 98% solids.

The foamed opacifying layer can also contain at least 0.002 weight %, or even at least 0.02 weight % and up to and including 1 weight % or up to and including 2 weight %, of one or more (e) opacifying colorants (as described above), based on the total weight of the foamed opacifying layer. Such (e) opacifying colorants can be present in locations described above. As noted above, the (e) opacifying colorants are different in composition and function from all other materials in the foamed opacifying layer. The possible locations of the (e) opacifying colorant are described above.

For example, a carbon black can be present as the (e) opacifying colorant in an amount of at least 0.002 weight % and up to and including 1 weight %, based on the total weight of the foamed opacifying layer, and can be present in the discrete pores of the (a) porous particles.

Substrates useful in the practice of the present invention can comprise various porous or non-porous materials including but not limited to woven and nonwoven textile fabrics composed of nylon, polyester, cotton, aramide, rayon, polyolefin, acrylic wool, porous glasses, fiberglass fabrics, or felt or mixtures thereof, or porous polymeric films [such as porous films derived from triacetyl cellulose, polyethylene terephthalate (PET), diacetyl cellulose, acetate butyrate cellulose, acetate propionate cellulose, polyether sulfone, polyacrylic based resin, for example, poly(methyl methacrylate), a polyurethane-based resin, polyester, polycarbonate, aromatic polyamide, polyolefins (for example, polyethylene and polypropylene), polymers derived from vinyl chloride (for example, polyvinyl chloride and a vinyl chloride/vinyl acetate copolymer), polyvinyl alcohol, polysulfone, polyether, polynorbornene, polymethyl pentene, polyether ketone, (meth)acrylonitrile], porous paper or other porous cellulosic materials, canvases, porous wood, porous plaster and other porous materials that would be apparent to one skilled in the art. The substrates can vary in dry thickness and in many embodiments, the substrate thickness is at least 50 µm.

Some useful substrates comprise a porous fabric comprising a plurality (at least two) continuous yarn strands woven or knitted together. As used herein, the "yarn" comprises continuous strands (at least two) of a material, which strands are twisted or woven together to form a "thread." Each yarn strand can comprise a multifilament core that is encased in a coating comprising a thermoplastic polymer.

The multifilament core can comprise multiple (at least two) filaments composed of naturally occurring fibers or polymers, or of synthetic polymers selected from the group consisting of an aramid, a polypropylene, a polyethylene, an acrylic resin, nylon, and a polyester. Alternatively, the multifilament core can comprise fiberglass as multiple filaments. Each of the multiple filaments can be composed of the same material or a mixture of such materials. Alternatively, the multiple filaments can be homogenous, but filaments composed of different materials can be used in the same multifilament core.

The multifilament core can be designed to have any desirable size and in general, it has an average diameter of at least 75 denier and up to and including 2500 denier, wherein a denier refers to 1.2 g/9000 meters of a filament.

Each filament of the multifilament core can further comprise a flame retardant, examples of which would be readily apparent to one skilled in the art. A multifilament core can be prepared using known technology, for example as described in U.S. Patent Application Publication 2007/0015426 (Ahmed et al.), the disclosure of which is incorporated herein by reference.

The coating applied to the multifilament core can comprise one or more thermoplastic polymers, including but not limited to a polyester elastomer, a polypropylene, a polyethylene, an ethylene octane copolymer, a substituted or unsubstituted vinyl chloride polymer (including homopolymer and copolymers derived in part from vinyl chloride), polyvinylidene fluoride, ethylene vinyl acetate, a thermoplastic polyurethane, poly(tetrafluoroethylene) (PTFE), a silicone resin, and various hot melt adhesives. Various grades or combinations of these materials can be used if desired. The term "thermoplastic" refers to a polymeric material or resin that changes properties when heated and cooled.

Substrates useful in this invention generally have an openness (or Openness Factor) of 0% and up to and including 10%, or at least 1% and up to and including 10%, or of at least 5% and up to and including 10%.

The substrates can be surface treated before application of the aqueous foamed composition by various processes including corona discharge, glow discharge, UV or ozone exposure, flame, or solvent washing in order to promote desired adhesion and other physical properties.

Non-Foamed Functional Composition Formulations

A non-foamed functional composition formulation according to this invention is intended to provide a non-foamed functional composition in the foamed, opacifying elements with one or more functional properties in the non-foamed functional composition as described below. A non-foamed functional composition can comprise the following essential and required components to achieve at least one advantage: (i) untreated synthetic silica in particulate form (as described below), one or more (iv) water-soluble or water-dispersible organic polymeric binders (also described below). However, in some embodiments, one or more of the following optional components can also be included in the non-foamed functional composition formulation with the noted essential components: a (ii) lubricant, a (iv) thickener, a (v) crosslinking agent for the one or more (iv) water-soluble or water-dispersible organic polymeric binder, and a (vi) coating aid, all described below.

As described in more detail below, a non-foamed functional composition formulation can be applied in a suitable manner to provide a non-foamed functional composition disposed over (for example, directly on) the foamed opacifying layer in a uniformly continuous manner to form a non-foamed functional layer that essentially covers all of the foamed opacifying layer on the substrate surface. In other embodiments, the non-foamed functional composition formulation can be arranged or disposed on the foamed opacifying layer in a discontinuous manner in small or large regions on the substrate surface, for example by spraying. In many embodiments, the non-foamed functional composition can be disposed directly on the foamed opacifying layer in a uniformly continuous manner or pattern wise manner so that there are no intermediate materials or layers between the foamed opacifying layer and the non-foamed functional composition.

The non-foamed functional composition formulation is not foamed to an appreciable extent, and thus, the resulting applied functional composition is also "non-foamed", that is having minimal voids or foam cells. In other words, the non-foamed functional composition formulation used in the present invention generally has a density of at least 1, which is greater than the density of the foamed opacifying layer.

The non-foamed functional composition formulation generally has a % solids of at least 1% and up to and including 15% with water being the predominant solvent (that is, water is more than 50 weight % and up to 100 weight % of total solvents).

The non-foamed functional composition can be present in a foamed, opacifying element at a dry coverage of at least 0.5 g/m$^2$ and up to and including 30 g/m$^2$ or of at least 1 g/m$^2$ and up to and including 20 g/m$^2$.

The non-foamed functional composition derived from the non-foamed functional composition formulation according to this invention can provide one or more functions simultaneously. For example, it can provide one or more of: a "release" function where the coefficient of friction between the foamed opacifying layer and any other solid surface is reduced allowing easy separation of the contacting surfaces; an anti-blocking function where microscopic protrusions or asperities help to minimize surface adherence between the foamed opacifying layer and any other solid surface by increasing the distance between the two contacting surfaces, thereby minimizing blocking; antimicrobial function (with one or more antimicrobial agents present); tactile function where the non-foamed functional composition enhances the tactile experience (or "feel") of the foamed opacifying layer; antistatic function to reduce static charge; and a soil resistance function to reduce potential soiling. More particularly, because of the presence of the (i) untreated synthetic silica, the non-foamed functional composition gives the resulting foamed, opacifying element a whiter appearance, for example so the overall L* value of the foamed, opacifying element is at least 80. The (i) untreated synthetic silica is typically present in particulate form.

Useful (i) untreated synthetic silicas such as fumed silica (also known as pyrogenic silica) and precipitated silica can be present in an amount of at least 0.5 weight % or at least 1 weight % and up to and including 5 weight % or up to and including 10 weight %, based on the total weight of the non-foamed functional composition formulation. Mixtures of both fumed silica and a precipitated silica can also be present as the (i) untreated synthetic silica.

(i) Fumed silica and precipitated silicas, both examples of untreated synthetic silicas, can be obtained from various commercial sources (such as Evonik or Cabot Corporation). In addition, fumed silica can be prepared by flame pyrolysis of silicon tetrachloride or from quartz sand vaporized in a very high temperature electric arc using known procedures. Precipitated silica can be produced by the controlled neutralization of dilute sodium silicate (waterglass) by either concentrated sulfuric, hydrochloric, or carbonic acids. The raw materials for this process are those required for the silicate, that is, sand, soda ash, caustic soda, and water.

Average particle diameters of the untreated synthetic silica particles are greater than 1 μm or even greater than 5 μm and less than 15 μm.

In the non-foamed functional composition, the (i) untreated synthetic silica is present in an amount of at least 15 weight % or at least 60 weight %, and up to and including 80 weight % or up to and including 95 weight %, all based on the total weight of the non-foamed functional composition.

An optional component of the non-foamed functional composition formulation is a (ii) solid or non-solid lubricant. Each solid lubricant generally has a crystallinity of at least 50% and melts very little at temperatures below 40° C. Its wax melt viscosity can be at least 5 centipoise (5 mPa-sec), or at least 10 centipoise (10 mPa-sec) and up to and including 100 centipoise (100 mPa-sec). Mixtures of the same or different types of materials can be used if desired. For example, such (ii) solid or non-solid lubricants can be selected from one or more components of the group consisting of nonliquid waxes, metal esters of fatty acids such as calcium soaps, graphite, silicone-based polymers, and fluoropolymers, or a combination of any of the same or different types of these materials. The (ii) non-solid or solid lubricants are different compositionally from all other components described herein for the non-foamed functional composition formulation.

Useful nonliquid waxes include but are not limited to, polyolefins such as polyethylene wax and polypropylene wax as well as long chain hydrocarbon waxes such paraffin wax. Other useful nonliquid waxes include carbonyl group-containing waxes such as long-chain aliphatic ester waxes; polyalkanoic acid ester waxes such as montan wax, trimethylolpropane tribehenate, and glycerin tribehenate; polyalkanol ester waxes such as tristearyl trimellitate, and distearyl maleate; and polyalkanoic acid amide waxes such as trimellitic acid tristearyl amide. Examples of useful aliphatic amides and aliphatic acids include oleamide, eucamide, stearamide, behenamide, ethylene bi)oleamide), ethylene bis (stearamide), ethylene bis(behenamide), and long chain acids include but are not limited to, stearic, lauric, montanic, behenic, oleic, and tall oil acids. U.S. Patent Application Publication 2010/0021838 (Putnam et al.) describes some representative nonliquid waxes in [0054], the disclosure of which is incorporated herein by reference. Useful materials of this type can be obtained from various commercial sources.

Useful metal esters of fatty acids include but are not limited to, compounds of metals complexed with fatty acids that are derived from vegetable oils or animal tallow, such as sodium, potassium, calcium, magnesium and aluminum soaps, wherein the fatty acids comprise at least 12 and up to and including 20 carbon atoms and are generally saturated or mono-unsaturated in nature. Representative compounds of this type, such as calcium stearate, can be obtained from various commercial sources.

Graphite can be provided in various forms and obtained from commercial sources.

A useful fluoropolymer is polytetrafluoroethylene (PTFE or Teflon) but other polymers comprising at least some fluorinated moieties can also be used if they have lubricating properties.

Non-solid lubricants are also useful including but not limited to, silicone-based polymers such as polydimethylsiloxanes having a molecular weight less than 10,000.

A (ii) solid or non-solid lubricant described herein may be present in the non-foamed functional composition formulation sufficient to provide a dry coverage of at least 0.01 g/m$^2$ and up to and including 30 g/m$^2$ or at least 1 g/m$^2$ and up to and including 10 g/m$^2$ in the resulting non-foamed functional composition. The amount of such materials in the non-foamed functional composition formulation to supply these "dry" coverages would be readily determined by a skilled worker.

An essential component in the non-foamed functional composition is one or more (iv) water-soluble or water-dispersible organic polymeric binders, each of which generally has $T_g$ below 25° C. (determined as described above using DSC) in which the (i) fumed silica is dispersed. Each (iv) water-soluble or water-dispersible organic polymeric binder can be film-forming, that is, it can form a film once applied and dried. Such materials can be self-crosslinkable or crosslinkable using an optional (v) crosslinking agent as described below. Useful one or more (iv) water-soluble or water-dispersible organic polymeric binders include but are not limited to, film forming polymers such as a partially hydrolyzed polyvinyl acetate, poly(vinyl alcohol), poly(vinyl pyrrolidone), cellulosic polymers (such as carboxymethyl cellulose and hydroxymethyl cellulose), a polysaccharide, a poly(ethylene oxide), acrylamide polymers, polyester ionomers, gelatin or gelatin derivatives, gellan, starches, polyethylene imine, polyvinyl amine, and derivatives of these materials, fluorinated polymers such as fluorinated polyurethanes, polymers containing siloxane moieties, polyurethanes, urethane-acrylic copolymers, other acrylic polymers derived at least in part from one or more acrylic esters or methacrylic esters, styrene-acrylic copolymers, vinyl polymers, polyesters, or a combination of two or more of same or different types of these organic polymer binders. Such one or more (iv) organic polymeric binders are readily available from various commercial sources or can be prepared using known starting materials and synthetic conditions. For example, a useful fluorinated polyurethane is available as 3M® Stain Resistant Additive SRC-220 from 3M Company. Yet another useful material is a self-crosslinking copolymer derived from n-butyl acrylate, ethyl acrylate, and N-methylol acrylamide having a glass transition temperature ($T_g$) that is less than −5° C. Thus, mixtures of such (iv) water-soluble or water-dispersible organic polymeric binders can be present, and particularly at least one of them is a fluorinated polyurethane. The one or more (iv) water-soluble or water-dispersible organic polymeric binders can be useful in the non-foamed functional composition for adhering the (i) fumed silica and any other components or additives to the outer surface of the foamed opacifying layer and, to provide an enhanced level of abrasion resistance and cohesiveness.

The one or more (iv) water-soluble or water-dispersible organic polymeric binders can be present in the non-foamed functional composition formulation in an amount of at least 0.05 weight % and up to and including 5 weight %, or of at least 0.1 weight % and up to and including 2 weight %, based on the total weight of the non-foamed functional composition formulation. In both the non-foamed functional composition formulation and the resulting non-foamed functional composition, it desirable to have a weight ratio of (i) untreated synthetic silica to the one or more (iv) water-soluble or water-dispersible organic polymeric binders of from 10:1 to and including 1:5, or from 10:1 to and including 1:1, or of from 5:1 to and including 1:1, or of from 4:1 to and including 2:1.

It may be beneficial to chemically crosslink some of the one or more (iv) water-soluble or water-dispersible organic polymeric binders that are crosslinkable to improve non-foamed functional composition cohesiveness by including a (v) crosslinking agent. Such (iv) water-soluble or water-dispersible organic polymeric binders can be at least partially curable or crosslinkable and can be cured up to and including 100% of all potential curable or crosslinking sites. The identity and amount of a suitable (v) crosslinking agent will depend on the choice of (iv) water-soluble or water-dispersible organic polymeric binder and its reactivity with the (v) crosslinking agent, the number of crosslinking sites available, compatibility with other functional composition components, and manufacturing constraints such as non-foamed functional composition formulation pot life, application means, and drying speed. Non-exclusive examples of (v) crosslinking agents include glyoxal, CARTABOND® TSI (Clariant), CARTABOND® EPI (Clariant), SEQUAREZ™ 755 (Omnova), glutaraldehyde sodium bisulfate complex (Aldrich), Sunrez 700M (Om nova), Sunrez 700C (Omnova), CR-5L (Esprix), bis(vinyl) sulfone, bis(vinyl) sulfone methyl ether, adipoyl dihydrazide, epichlorohydrin polyamide resins, and urea-formaldehyde resins, all of which are available from various commercial sources. In one embodiment, a crosslinked (iv) water-soluble or water-dispersible organic polymeric binder includes a hydrolyzed polyvinyl acetate polymer that has been crosslinked using an (v) epichlorohydrin polyamide resin compound. The amount of suitable (v) crosslinking agent in the non-foamed functional composition formulation would be readily apparent to one skilled in the art based on the concentration of crosslinkable sites in the (iv) crosslinkable water-soluble or water-dispersible organic polymeric binder(s).

It is also optional to include a (vi) thickener in the non-foamed functional composition formulation, or mixtures thereof. Useful (vi) thickeners are generally non-associative thickeners, and examples of which are alginates, guar gum, locust bean gum, xanthan gum, acrylic polymers that are alkali swellable, agar, carboxymethyl cellulose, pectin or carrageenan. Such (vi) thickeners may be present in the non-foamed functional composition formulation in an amount of at least 0.001 weight % and up to and including 10 weight %, based on the total weight of the non-foamed functional composition formulation, and the amount can be adjusted to achieve the desired viscosity for the non-foamed functional composition formulation for a specific method of application to the opacifying layer. Such (vi) thickeners can be obtained from various commercial sources.

It is further optional to include in the non-foamed functional composition formulation one or more (vii) coating aids (or wetting surfactants) to aid in the coating or deposition of the non-foamed functional composition formulation. If the non-foamed functional composition is designed or applied to cover essentially all of the substrate surface using a known coating procedure, any coating aid (or wetting surfactant) that will lower the surface tension of the non-foamed functional composition formulation sufficiently to prevent edge-withdrawal, repellencies, and other coating defects can be used. For example, useful (vii) coating aids (or wetting surfactants) include but are not limited to, alkyloxy- or alkylphenoxypolyethers and polyglycidol derivatives and their sulfates, such as nonylphenoxypoly(glycidol) that are available from Olin Matheson Corporation; sodium octylphenoxypoly(ethyleneoxide) sulfate; organic sulfates and sulfonates, such as sodium dodecyl sulfate, sodium dodecyl sulfonate, sodium bis(2-ethylhexyl) sulfosuccinate (Aerosol OT); and alkyl carboxylate salts such as sodium decanoate, all obtainable from various commercial sources.

If the non-foamed functional composition formulation is to be disposed on the single foamed opacifying layer by spraying, (vii) coating aids or wetting surfactants known in the art as spreading agents that are capable of reducing the surface tension substantially to aid in the formation of small drops can be present. Examples of such coating aids are trisiloxanes like SILWET® L-77 and SILWET® L-7608, COATOSIL® 77 nonionic organo-modified trisiloxane, and acetylenic diols such as SURFYNOL® 104 and SURFYNOL® 104A, obtainable from various commercial sources. Useful (vii) coating aids (wetting surfactants) generally have a hydrophilic-lipophilic balance (HLB) number of at least 5, or more likely of at least 7. HLB is a known parameter used to define the hydrophilic and lipophilic properties and components of surface active agents and can be determined using known methods and apparatus.

Useful (vii) coating aids of this type may be present in the non-foamed functional composition formulation in an amount of at least 0.01 weight % and up to and including 5 weight %, based on the total weight of the non-foamed functional composition formulation.

The non-foamed functional composition formulation (and corresponding non-foamed functional composition) can include one or more of other optional additives that provide various properties or characteristics. For example, the non-foamed functional composition formulation can include a biocide or antimicrobial agent of which there are numerous materials known in the art for this purpose; antistatic agents known in the art to dissipate electrical charge and static; tactile modifiers that change the "feel" of outer surface of the foamed, opacifying element; visual modifiers that provide a matte, opalescent or other such desirable look; and soil resistance agents that reduce the potential for soiling from handling or spills. Combinations of the same or different type of material can be present. In all cases, these optional addenda are different from the (i) through (vii) components described above.

It is also optional but preferable, for the non-foamed functional composition formulation (and corresponding functional composition) to include glass particles (either completely solid, porous, or hollow in nature) that generally have an average particle size of at least 5 µm, or at least 20 µm and up to and including 100 µm, or up to and including 60 µm, or even at least 20 µm and up to and including 40 µm. Average particle size can be determined by using known procedures and equipment to measure the largest diameter of a plurality of glass particles and determining an arithmetic average.

Useful glass particles can be made from different chemical types of glasses. This includes soda-lime borosilicate, alkali-free or fused silica, among other specialized glasses. Such materials can be obtained from various commercial sources or prepared using known procedures and starting materials. While completely solid glass particles can be used in some embodiments, it may be desirable that the glass particles are "hollow" glass particles having a single void volume surrounded by a "shell" of glass. Examples of useful commercial hollow glass particles of this nature include soda-lime-borosilicate hollow glass particles from 3M that are available as a series of products for different applications, for example, the S series, K series, iM series, XLD series, and HGS series. Of these the iM16K hollow glass particles are particularly desirable.

The useful glass particles can have a density of at least 0.1 g/cm$^3$ and up to and including 2.2 g/cm$^3$ depending upon whether they are hollow glass particles or solid glass particles.

When present, the glass particles (such as hollow glass particles) can be present in the non-foamed functional composition in the foamed, opacifying element in an amount of at least 10 weight % and up to and including 99 weight %, or more likely of at least 25 weight % and up to and including 80 weight %, based on the total weight of the non-foamed functional composition. The corresponding amounts of the glass particles (for example, hollow glass particles) in the non-foamed functional composition formulation can be at least 0.25 weight % and up to and including 20 weight %, or at least 0.5 weight % and up to and including 10 weight %, all based on the total weight of the non-foamed functional composition formulation.

In some embodiments, the non-foamed functional composition can comprise hollow glass particles in combination with the (i) untreated synthetic silica such as the hollow glass particles in combination with precipitated silica or foamed silica.

Method of Providing Non-Foamed Functional Compositions and Foamed, Opacifying Elements The foamed, opacifying elements described herein can be prepared using essential functions A) through F) described below, and generally in the listed order.

Firstly, the method is carried out by A) providing a substrate having a first opposing side (or surface) and a second opposing side (or surface). Useful substrate materials are described above.

A foamable aqueous composition as described above consisting essentially of components (a) through (e) in the described amounts and having at least 35% solids and up to and including 70% solids, is foamed in a suitable manner to provide a foamed aqueous composition. A foamable aqueous composition can be aerated to provide a foamed aqueous composition having a foam density of at least 0.1 g/cm$^3$ and up to and including 0.5 g/cm$^3$, or of at least 0.15 g/cm$^3$ and up to and including 0.4 g/cm$^3$, or even of at least 0.15 g/cm$^3$ and up to and including 0.27 g/cm$^3$. This aeration procedure can be carried out using suitable conditions and equipment that would be readily apparent to one skilled in the art in order to create a "foam," for example in the presence of a foaming agent that is present as at least one of the (c) one or more additives described above. For example, aeration can be carried out by mechanically introducing air or an inert gas (such as nitrogen or argon) in a controlled manner. High shear mechanical aeration can be carried out using sonication or high-speed mixers, such as those equipped with a cowles blade, or with commercially available rotorstator mixers with interdigitated pins such as an Oakes mixer or a Hobart mixer, by introducing air under pressure or by drawing atmospheric air into the foamable aqueous composition with the whipping action of the mixer. Suitable foaming equipment can be used in a manner to provide the desired foam density with modest experimentation. It can be useful to chill or cool the foamable aqueous composition below ambient temperature to increase stability by increasing composition viscosity, and to prevent its collapse. This chilling operation can be carried out immediately before, immediately after, or during the aeration procedure. Stability of the foamed aqueous composition can also be enhanced by the presence of a foam stabilizing agent as another of the (c) one or more additives.

Once the foamed aqueous composition has been formed, it can be B) disposed or applied only to the first opposing side of a suitable substrate (described above), such as a porous woven substrate. This procedure can be carried out in any suitable manner that does not undesirably diminish the foam density (or foam structure) of the foamed aqueous composition. For example, the substrate first opposing surface can be coated with the aqueous foamed composition using any suitable known coating equipment (floating knife, hopper, blade, or gap) and coating procedures including but not limited to, blade coating, gap coating such as "knife-over-roll" and "knife over table" operation, floating knife, slot die coating, or slide hopper coating, especially if multiple layers are applied to the substrate in the same operation. Useful layer forming (coating) means are described, for example, in U.S. Pat. No. 4,677,016 (noted above), the disclosure of which is incorporated herein by reference for such coating details.

In many embodiments, the foamed aqueous composition can be disposed directly onto the first opposing surface of the substrate ("directly" means there are no intervening or intermediate layers).

The amount of foamed aqueous composition to be applied should be sufficient to provide a dry coverage of less than or equal to 10 ounces (mass)/yard$^2$ (or less than or equal to 339.08 g/m$^2$), or at a dry coverage of at least 1.5 ounces (mass)/yard$^2$ (or 50.86 g/m$^2$) and up to and including 7 ounces (mass)/yard$^2$ (237.35 g/m$^2$).

Once the foamed aqueous composition has been formed on the first opposing surface of the substrate, it can be C) dried to provide a foamed opacifying layer. There may be some partial and unintentional curing of the (b) binder material at this point to form some (b') matrix material, but it is generally not desirable for substantial curing to take place during the C) drying. Drying can be accomplished by any suitable means such as by heating with warm or hot air, microwaves, or IR irradiation at a temperature and time sufficient for drying (for example, at less than 160° C.) to provide a foamed opacifying layer. No additional foamed opacifying layers are foamed on this first opposing surface of the substrate.

After drying, the single (or only) foamed opacifying layer on the substrate can be D) densified or crushed on the substrate to reduce the foamed layer thickness. Thus, the C) drying and D) densifying operations can be carried out sequentially without much delay between the two features. A densified or crushed foamed opacifying layer is formed using this combination of functions.

D) Densifying or crushing is a process of subjecting the foamed opacifying layer to mechanical pressure, to densify the foam cells and to reduce overall layer thickness (or volume). This process can be carried out in any suitable manner, but it is generally carried out by a process that provides pressure to the foamed opacifying layer, for example, by passing it while on the substrate through a compression calendering operation, pressing operation, or embossing operation, or a combination thereof. For example, the foamed opacifying layer on the substrate can be pressed between flat plates or through nip rollers under pressure, or it can be passed through a combination of calendering and embossing rollers to reduce the thickness of the foamed opacifying layer and to densify the foam cells. The original thickness of the foamed opacifying layer can be reduced by at least 20% (by volume) during such an operation. This process can be considered a "densifying operation" as the foamed opacifying layer is made denser while it is pressed together. The thickness of the foamed opacifying layer before and after densifying can be determined by a known technique such as laser profilometry.

The D) densifying process can be carried out at any suitable temperature including room temperature (for example, 20-25° C.) and up to and including 90° C., or more likely at a temperature of at least 20° C. and up to and including 80° C. The D) densifying process is carried out at nip pressures that are suitable for the construction of the substrate including the openness factor to prevent over crushing and consequent loss of uniform opacity of the foamed opacifying layer. A useful crushing pressure can be determined using routine experimentation depending upon several factors including the foamed aqueous composition and type of substrate used. For example, a useful densifying pressure can be at least 15 psi (103.4 kPa) and up to and including 200 psi (1379 kPa).

Once D) densifying is completed, a suitable non-foamed functional composition formulation according to this invention, can be applied in the E) feature in a suitable manner to the foamed opacifying layer. For example, the applying step E) can be carried out immediately after the D) densifying step without intermediate steps.

At some time after the D) densifying operation, the method according to this invention comprises E) applying or disposing a non-foamed functional composition formulation to the foamed opacifying layer, which non-foamed functional composition formulation comprises at least the (i) untreated synthetic silica and one or more (iv) water-soluble or water-dispersible organic polymeric binders described above.

The non-foamed functional composition formulation can be disposed directly on the foamed opacifying layer using any number of suitable application techniques such as uniformly or non-uniformly spraying, wrapped wire rod coating, rotary screen coating, air knife coating, screen printing, gravure coating or flexographic printing (or other offset coating techniques), reversed roll coating, slot coating, gap coating, blade coating, extrusion hopper coating, roll coating, slide coating, curtain coating, pad coating, and other techniques that would be readily apparent to one skilled in the art. For example, application of the non-foamed functional composition formulation can be carried out using an engraved flexible or non-flexible roller in an "anilox coating system" where the non-foamed functional composition formulation, usually of controlled viscosity, is deposited on the flexible or non-flexible roller. A doctor blade is used to meter excess fluid from the surface leaving just a measured amount of fluid in the engraved cells. The anilox roll then rotates to contact the outer surface of the foamed opacifying layer that receives the non-foamed functional composition formulation from the cells.

It is also particularly desirable to apply the functional composition formulation in a non-contact manner onto the foamed opacifying layer such as using any suitable spray apparatus and system, especially when the non-foamed functional composition formulation comprises one or more (vii) coating aids. There are several methods for spraying fluids onto surfaces that are known in the art and that can be used in the practice of this invention. These include compressed air spraying that converts the drops of the non-foamed functional composition formulation into a mist; electrostatic spray systems where application of electric field at the nozzle controls the drop size and the electric field between the drop of non-foamed functional composition formulation and the surface controls its deposition; ultrasonic spray systems where the ultrasonic energy can be used to create a mist of uniform drop size of the functional composition formulation; and rotary spray that uses centrifugal force to atomize the non-foamed functional composition formulation. The most common spray technology uses fluid pressure and nozzle design to create non-foamed functional composition formulation drops of a desired size. In addition to controlling drop size, nozzle designs also include the geometry of an ensemble of drops exiting the nozzle. Such geometries include for example, a cone, a fan (trapezoidal), or a jet. The choice of the geometry is selected based on the application method and, depends upon the orientation between the spray nozzle and the substrate and whether the spray system is mobile and the surface is stationary or vice versa or a combination of the two. In all of these methods of applying the non-foamed functional composition formulation, foaming is minimized and is not intentionally done because foam is undesirable in such functional coatings as it can lead to surface defects during application, impacting the quality, appearance and functionality of the resulting functional coating.

A desirable method of applying the non-foamed functional composition formulation according to the present invention is to use a stationary spray system with a moving surface. In this instance, the desired geometry of the ensemble of non-foamed functional composition formulation drops exiting a nozzle is a that of a fan with the article containing the foamed opacifying layer moving perpendicular to the plane of the fan. When the surface width is larger than the width of the fan, multiple nozzles can be employed and spaced apart such that the overlapping sprays from adjacent nozzles creates a uniform coverage of drops across the width of the surface. In addition to using hydraulic pressure to disperse the drops, other mechanical forces such as nozzle pulsation, ultrasound, centrifugal force, or air currents, or a combination of two or three of these means, can be used to aid uniform distribution of the non-foamed functional composition formulation onto the surface. Another aspect of controlling the uniformity of depositing the non-foamed functional composition formulation is to control its properties, specifically its viscosity and surface tension, properties well known to those of ordinary skill in the art. For example, for achieving desirable small drops, the viscosity and surface tension at the shear rates experienced at the nozzle should be as low as possible. Shearing thinning fluids are preferred such that the viscosity at the nozzle shear rates is as low as possible. In such embodiments, the non-foamed functional composition formulation comprises a suitable (vii) coating aid (wetting surfactant), such as any low molecular weight surfactant, that can lower the dynamic surface tension of the non-foamed functional composition formulation and provide the lowest surface tension. Useful surfactants for this purpose are based on silicones such as for example, organo-modified trisiloxanes as well as others described above.

A uniformly distributed coating of non-foamed functional composition can be formed over (or directly on) the foamed opacifying layer, or discontinuous applications of non-foamed functional composition formulation can be made to provide regular or irregular patterns by spraying or other application techniques. When disposed in a discontinuous manner, the non-foamed functional composition can be present as isolated discontinuous patterns or coalesced to form a uniform deposition on the foamed opacifying layer.

The applied non-foamed functional composition formulation can be dried by simple evaporation of water and any other solvents, to form the non-foamed functional composition on the foamed opacifying layer. This drying can be accelerated by known techniques such as convection heating including forced air or infrared heating, or other means that would be apparent to one skilled in the art. The drying can also be carried out or continued in the F) curing operation described as follows.

F) Curing the non-foamed functional composition and the foamed opacifying layer can be carried out under suitable conditions known to one skilled in the art, for example to convert most of all of the b) binder materials to form (b') matrix materials. For example, curing (and drying) can be accomplished using heat or infrared radiation or other conditions to which the (b) binder materials and catalysts in the foamed opacifying layer, and the one or more (iv) water-soluble or water-dispersible organic polymeric binders and (v) crosslinking agents, are responsive to achieve crosslinking. In some embodiments, a suitable functionalized self-crosslinking latex composition can be used as the (b) binder material, as the one or more (iv) water-soluble or water-dispersible organic polymeric binders, or both. During this operation, a curing or crosslinking reaction can occur between reactive side groups of suitable curable polymer chains.

Further details of coating and drying techniques are described in further detail in Research Disclosure No. 308119, December 1989, pages 1007-1008 and in references cited therein. Curing of the applied functional composition can also be carried out during or subsequently to F) curing at temperatures for example, from 100-160° C.

The foamed opacifying layer can be embossed after the C) drying step and before the F) curing step using the procedure and equipment described below.

Alternatively, after the F) curing operation, it is possible to provide an embossed design on an outer surface of the foamed, opacifying element, for example by patterned embossing or calendering the outer surface, to create selected regions of high or low opacity and thickness. The resulting embossed design can be viewed from either side in transmission.

It is further possible to form images on either outer surface of the foamed, opacifying element, with or without a primer, using any suitable printing means such as inkjet printing, screen printing, or flexographic printing, thereby forming printed images of text, pictures, symbols, or combinations thereof. Such printed images can be visible, or they can be invisible to the unaided eye (for example, using fluorescent dyes in the printed images). Alternatively, the outer surface can be covered by suitable means with a colorless layer to provide a desired protective finish. In many instances, the image formed in this manner, for example, on one outer surface, is not visible or discernible from the other outer surface.

A thermally printed image can be formed on either outer surface, for example, by using a thermal (sublimable) dye transfer printing process (using heat and with or without pressure) from one or more thermal donor elements comprising a dye donor layer comprising one or more dye sublimation printable colorants. For example, a thermal colorant image can be obtained using one or more thermal dye patches (containing appropriate one or more dye sublimation thermal transfer colorants) with or without a thermal colorless (clear) patch. Useful details of such a process are provided in U.S. Pat. No. 10,145,061 (Nair et al.), the disclosure of which is incorporated herein by reference.

Thus, dye sublimation thermal transfer printing is a method to impart a desired color or color pattern or image to an outer surface of a synthetic fabric substrate such as polyester, nylon and acrylic materials. Dye sublimation thermal transfer printing utilizes thermally responsive inks containing sublimable dyes or colorants that, under the influence of heat sublime or vaporize onto the outer surface of the fabric, penetrate the fibers, and become entrained therein or attached to the textile fiber. Dye sublimation thermal transfer printing processes and materials used therein are known and are described in numerous publications, for example, in U.S. Pat. No. 3,363,557 (Blake), 3,952,131 (Sideman), 4,139,343 (Steiner), 6,036,808 (Shaw-Klein et al.), 8,628,185 (Hale et al.), 9,315,682 (Delys et al.), 4,117,699 (Renaut), 4,097,230 (Sandhu), 4,576,610 (Donenfeld), 5,668,081 (Simpson et al.), and 7,153,626 (Foster et al.), the disclosures of all of which are incorporated herein by reference.

The following Examples are provided to illustrate the practice of this invention and are not meant to be limiting in any manner. The following materials were used in the Examples.

Materials Used in the Following Examples:

The continuous polymeric phase polymers used in the following examples were the EASTMAN™ Cellulose Acetate Butyrate 381-0.5 (CAB), a cellulose ester, $T_g$ of 130° C. (obtained from Chem Point).

COATOSIL™ 77 is nonionic organo-modified trisiloxane surfactant (coating aid) that was obtained from Momentive Performance Materials.

NALCO® 1060 containing colloidal silica was obtained from Nalco Chemical Company as a 50 weight % aqueous dispersion.

CATALOX® 18HTFa-150 alumina was purchased from Sasol.

TiPure™ R-900 titanium dioxide was purchased from Chemours.

Acematt® TS 100 fumed silica and Acematt® 790 precipitated silica products were purchased from Evonik.

The poly(methylamino ethanol adipate) (AMAE co-stabilizer) was prepared using known procedures and starting materials.

Carboxy methylcellulose (CMC, 250,000 kDa) was obtained from Ashland Aqualon as AQUALON™ 9 M31F.

The amphiphilic block copolymer of polyethylene oxide and polycaprolactone (PEO-b-PCL) 5K-20K, was prepared using the procedure described in U.S. Pat. No. 5,429,826 (Nair et al., the disclosure of which is incorporated herein by reference) where the first number is the molecular weight of the hydrophilic block segment, PEO, and the second number is the molecular weight of the oleophilic block segment, PCL.

TERGITOL® 15-S-7, a C12-C14 secondary alcohol surfactant having an HLB value of 12.4, was obtained from the Dow Chemical Corporation.

The optical brightener TINOPAL® OB CO was obtained from BASF Corporation.

Styrene-co-divinyl benzene copolymer ("SD matte"), 6 μm matte beads, were made in-house using known suitable ethylenically unsaturated polymerizable monomers and a known polymerization procedure.

The carbon black (K) was used as an (e) opacifying colorant in the form of an aqueous dispersion available as Black Pearls 880 obtained from Cabot Corporation.

DISPERSBYK® 022, a silicone based defoamer, was obtained from BYK-Chemie USA.

SOLSPERSE® 43000, a polyacrylate polymeric dispersant, was obtained from Lubrizol Corp.

Xanthan gum was obtained under the tradename Kelzan (manufactured by Kelco Inc.).

Hollow glass particles were obtained from 3M Corporation under the tradename iM16K. They had an average particle size of 20 μm and a density of 0.46.

The porous fabric substrates used in the Examples below were composed of a polyester, having a weight of about 80-110 g/m².

The foamable aqueous composition (CF drapery compound) was made from a formulation comprising: a self-crosslinking copolymer (P1) derived from n-butyl acrylate, ethyl acrylate, and N-methylol acrylamide using a known procedure, and having a glass transition temperature ($T_g$) of approximately −25° C. as the (b) binder material from which the (b') matrix material was derived; (c) additives titanium dioxide; clay filler; a flame retardant; a foaming surfactant; and foam stabilizing agent. The self-crosslinking copolymer P1 was also used as the (iv) water-soluble or water-dispersible organic polymeric binder in the non-foamed functional composition formulations.

Measurements:

The mode particle size of the (a) porous particles was measured using a Sysmex FPIA-3000 Flow Particle Image Analyzer available from Malvern Panalytical. The particle size of the dispersed pigments was determined using light scattering.

The porosity of the (a) porous particles was measured using a modified version of the known mercury intrusion porosimetry method.

A Hunter Labs UltraScan XE colorimeter equipped with an integrating sphere and a pulsed Xenon light source and appropriate filters for standard D65 illumination was used in conjunction with the CIELAB color space to calculate specific values for the lightness (L*), red-green character (a*), and yellow-blue character (b*) of each foamed opacifying layer.

Preparation of Pigment Dispersions for Porous Particles:

The opacifying pigment dispersion was prepared by combining dry pigment, a dispersant as described in TABLE I below, and an aqueous medium in a suitable milling vessel. The particle size of the pigment was reduced by milling it using ceramic media until all pigment particles were reduced below a diameter of 1 μm as determined by optical microscopy.

TABLE 1

Colorant Dispersions

| Dispersion | Pigment | Dispersant (weight % of Pigment) | Pigment Weight % |
|---|---|---|---|
| D-K ("black") | K | SOLSPERSE ® 43000 (5) DISPERSBYK ® 022 (0.05) | 25 |

Preparation of (a) Porous Particles PP:

The (a) porous particles PP used for preparing a foamed, opacifying element contained 1 weight % of optical brightener (identified below) in the continuous CAB polymeric phase and 0.8 weight % opacifying colorant (K) in the discrete pores.

An aqueous phase was made up by dissolving 5 grams of CMC in 240.5 grams of distilled water and adding to it 4.3 grams of the D-K dispersion containing 18.6 weight % of carbon black. This aqueous phase was dispersed in 831.8 grams of an oil phase containing 97.7 grams of CAB, 2 grams of PEO-b-PCL, and 1 gram of the optical brightener, TINOPAL® OB CO in ethyl acetate, using a homogenizer. A 975-gram aliquot of the resulting water-in-oil emulsion was dispersed using the Silverson L4R homogenizer for two minutes at 1200 RPM, in 1625 grams of a 200 mmolar pH 4 acetate buffer containing 39 grams of NALCO® 1060 colloidal silica, and 9.75 grams of AMAE co-stabilizer followed by homogenization in an orifice homogenizer at 1000 psi (70.4 kgf/cm$^2$) to form a water-in-oil-in-water double emulsion. The ethyl acetate was removed under reduced pressure at 40° C. after dilution of the water-in-oil-in-water emulsion with an equal weight of water. The resulting suspension of solidified porous particles PP was filtered, and the isolated porous particles PP were washed with water several times, followed by rinsing with a 0.05 weight % solution of TERGITOL® 15-S-7 surfactant. The isolated porous particles PP were then air dried. They had a mode particle size of 5.4 μm and a porosity of 46 volume %. Typically, the discrete pores contained within the porous particles PP prepared according to this procedure had an average diameter of from 150 nm and up to and including 1,500 nm. The moisture content of the final powder was 56%.

Preparation of Foamable Aqueous Opacifying Compositions; Foamed Aqueous Composition Formulations; and Foamed, Opacifying Element A1:

A foamable aqueous opacifying composition containing porous particles PP was prepared by combining 191 grams of porous particles PP with 1209 grams of CF drapery compound (that contains a sulfosuccinamide as a foaming surfactant and ammonium stearate as a foam stabilizing agent). Porous particles PP were dispersed into the mixture by stirring at 1200 rev/minute using a 50-mm diameter Cowles blade at ambient temperature for 30-60 minutes. The resulting foamable aqueous opacifying composition was used to prepare a foamed aqueous composition under pressure using an Oakes 2M Laboratory Mixer Model 2MBT1A. Each resulting foamed aqueous opacifying composition, having a foam density of from 0.18 g/cm$^3$ to 0.25 g/cm$^3$, was coated onto a ("first opposing") surface of the porous substrate described above using a coating knife, dried at a temperature of from 85° C. to 145° C. until the moisture content was less than 2 weight %, and crushed ("densified") on the porous substrate between hard rollers under pressure. The dried and crushed foamed opacifying composition was further cured at 160° C. for 2 minutes to crosslink the (b) binder material and form the resulting (b') matrix material. The resulting foamed, opacifying element A1 was used to create element samples using a non-foamed functional composition according to the present invention. This foamed, opacifying element exhibited an optical density (OD) of 5.4 for the foamed opacifying layer weight of 168 g/m$^2$.

Preparation and Use of Non-Foamed Functional Composition Formulations:

A 0.1 weight % aqueous solution of Xanthan gum (thickener) in water was prepared in which was present 1-2 weight % of (iv) water-soluble or water-dispersible organic polymeric binder(s) as shown below in TABLE II along with 3 weight % of the (i) inventive untreated synthetic silica "additive" or a non-inventive "additive" such as titanium dioxide or aluminum oxide, and 0.2 weight % of COATO-SIL™ 77 (vii) wetting surfactant or coating aid. The weight % of the (i) inventive untreated synthetic silica or a non-inventive "additive" in each of the respective dried non-foamed functional composition (or sometimes, layer) was 60 to 75 weight %, based on the total weight of the dry non-foamed functional composition.

Forming Non-Foamed Functional Composition:

An automatic spray system activated with air at 50 psi (3.51 kgf/cm$^2$), 1.5 mm orifice nozzle, and a 110° fan angle were used to spray each non-foamed functional composition formulation onto the foamed opacifying layer disposed on the fabric substrate in a roll-to-roll system. The amount of non-foamed functional composition formulation so deposited was controlled at an application speed at 15 yards (13.6 meters) per minute, and by using the control parameters of the spray system such as duty cycle and frequency, in order to deposit a consistent amount of non-foamed functional composition formulation for each variation. The non-foamed functional composition formulation was sprayed for each sample using only one pass in order to see the capability of each non-foamed functional composition formulation without bias. Each sprayed non-foamed functional composition formulation was dried in a convection oven first at 135° C. and then at 160° C. to cure and crosslink the components in each resulting non-foamed functional composition at a dry coverage of 5-10 g/m² to form a foamed, opacifying element.

Release Testing:

A buck press is a clam-shell press that mimics the temperature and pressure in the nip of a thermal dye transfer process (sublimation) printer. It has one side that can be heated and a second side that is not heated. Both surfaces are padded with a thermally conductive layer and the two surfaces can be pressed together under a controlled pressure. This apparatus was used to thermally print images onto to the samples of the foamed, opacifying elements described above. Each foamed, opacifying element was sandwiched between a thermal dye donor element and a release paper (obtained from PROTEX, of 19 g/m² weight) with the thermal dye donor in contact with the polyester fabric substrate, and the release paper in direct contact with the non-foamed functional composition. The combination (packet) comprising the thermal dye donor, opacifying element, and the release paper was placed within the buck press where the heated side of the buck press was in contact with thermal dye donor and the non-heated side was in contact with the release paper. A pressure of 2 psi (0.141 kgf/cm²) and temperature of 204° C. were maintained for 32 seconds for each experiment. After this thermal dye transfer process was carried out, the release paper was peeled off the non-foamed functional composition on each opacifying element. The ease of peeling was rated from 0 through 10 where the 0 is the value for the easiest release and 10 was the value where the release paper was completely stuck to the back side of the polyester fabric substrate of the foamed, opacifying element.

The following TABLE II shows the colorimetric evaluations obtained for these examples.

synthetic silica particles with or without the hollow glass particles (Inventive Examples 1-4) provided a visual appearance of the opacifying element sample that was changed relative to the original foamed, opacifying element sample (Control 1) from which a non-foamed functional composition had been omitted, as evidenced by the change in L*a*b* values. In particular, the L* values of the inventive foamed, opacifying elements greater than 80 implies that the non-foamed functional compositions increased the element whiteness relative to the opacifying elements of Control 1 as well as to Controls 2-4. The non-foamed functional composition formulation additives used for Controls 2-4 were not able to stay on the surface to impart the whiteness instead disappeared into the foamed opacifying layer in the non-inventive opacifying elements. Fumed silica on the other hand was retained on the surface and able provide whiteness in the inventive foamed, opacifying elements.

Moreover, the non-foamed functional compositions used in the present invention were very uniform in appearance when present in the foamed, opacifying elements and differed very little in uniformity of appearance from the foamed, opacifying elements from which a non-foamed functional composition had been omitted, except for whiteness. The opacifying elements of Controls 2-4 on the other hand had a mottled, non-uniform appearance in the outer surface due to the presence of non-inventive non-foamed functional compositions.

In addition, the foamed, opacifying elements according to the present invention having a non-foamed functional composition containing the untreated synthetic silica particles exhibited easy release from the release paper. However, those Control opacifying elements having a non-foamed functional composition from which untreated synthetic silica particles had been omitted, exhibited difficult release from the release paper.

The invention has been described in detail with particular reference to certain preferred embodiments thereof, but it will be understood that variations and modifications can be obtained within the spirit and scope of the invention.

TABLE II

| Example | Non-foamed Functional Composition Formulation "Additive" | (iv) Binder P1/SRC220 | Release Testing Rating 0 = best 10 = worst | Appearance | CIELab values L* | a* | b* |
| --- | --- | --- | --- | --- | --- | --- | --- |
| Control 1 | None | NA | 10 | | 78.29 | −0.22 | −1.46 |
| Control 2 | NALCO ® 1060 Colloidal Silica | 100/0 | 4 | Darker than control 1 | 77.53 | −0.07 | −2.79 |
| Control 3 | Catalox ™ 150 Alumina | 70/30 | 7 | Looked same as control 1 | 78.04 | 0 | −2.97 |
| Control 4 | TiPure ™ Titanium dioxide | 70/30 | 10 | Yellowish hue, mottle | 78.16 | −0.35 | −2.05 |
| Invention Example 1 | ACEMATT ® TS100 Fumed silica | 50/50 | 0 | White and uniform | 84.36 | −0.16 | −6.66 |
| Invention Example 2 | ACEMATT ® TS100 + Hollow glass particles iM16K | 50/50 | 0 | White and uniform | 83.27 | −0.29 | −5.78 |
| Invention Example 3 | ACEMATT ® TS100 + Hollow glass particles iM16K | 100/0 | 0 | White and uniform | 84.17 | −0.07 | −4.85 |
| Invention Example 4 | ACEMATT ® 790 + Hollow glass particles iM16K | 100/0 | 0 | White and uniform | 84.4 | −0.15 | −4.82 |

The data in TABLE II provide information about the advantages of the present invention. The foamed, opacifying elements according to the present invention having a non-foamed functional composition containing the (i) untreated

The invention claimed is:

1. A method for preparing a foamed, opacifying element, the method comprising following steps A) through F), in order, unless otherwise indicated:

A) providing a substrate having a first opposing side and a second opposing side;

B) applying a foamed aqueous opacifying composition having a foam density of at least 0.1 g/cm³ and up to and including 0.5 g/cm³, onto the first opposing side of the substrate;

C) drying the applied foamed aqueous opacifying composition, to provide a foamed opacifying layer;

D) densifying the foamed opacifying layer to reduce its thickness by at least 20% by volume;

E) applying a non-foamed functional composition formulation to the foamed opacifying layer; and F) curing the applied non-foamed functional composition formulation and the foamed opacifying layer to provide a non-foamed functional composition on the foamed opacifying layer, thereby providing a foamed, opacifying element having an L* value of at least 80, and having the foamed opacifying layer as the only opacifying layer and the non-foamed functional composition as the outermost composition on the first opposing side of the substrate, wherein:

the foamed opacifying layer comprises:

(a) at least 0.1 weight % and up to and including 35 weight % of porous particles, each porous particle comprising a continuous polymeric phase and discrete pores dispersed within the continuous polymeric phase, the porous particles having a mode particle size of at least 2 µm and up to and including 50 µm;

(b') at least 10 weight % and up to and including 80 weight % of a matrix material that is derived from a (b) binder material having a glass transition temperature ($T_g$) of less than 25° C.;

(c) at least 0.0001 weight % and up to and including 50 weight % of one or more additives selected from the group consisting of dispersants, foaming agents, foam stabilizing agents, plasticizers, flame retardants, optical brighteners, thickeners, biocides, and tinting colorants;

(d) less than 5 weight % of water; and (e) at least 0.002 weight % of an opacifying colorant different from all of the one or more additives of (c), which opacifying colorant absorbs electromagnetic radiation having a wavelength of at least 380 nm and up to and including 800 nm, all amounts being based on the total weight of the foamed opacifying layer; and the non-foamed functional composition formulation is a non-foamed aqueous dispersion having at least 1% solids and up to and including 15% solids, and comprises the following essential (i) and (iv) components and any of the optional (ii), (v), (vi), and (vii) components:

(i) untreated synthetic silica in an amount of at least 0.5 weight % and up to and including 10 weight %, based on the total weight of the non-foamed functional composition formulation;

a (ii) solid or non-solid lubricant;

one or more (iv) water-soluble or water-dispersible organic polymeric binders, each having a glass transition temperature ($T_g$) below 25° C.;

a (v) crosslinking agent if it is needed to crosslink the water-soluble or water-dispersible organic polymeric binder;

a (vi) thickener; and a (vii) coating aid having a hydrophilic-lipophilic balance number of at least 5, wherein the weight ratio of the (1) untreated synthetic silica to the one or more (iv) water-soluble or water-dispersible organic polymeric binders, is at least 10:1 to and including 1:1.

2. The method of claim 1, wherein the outermost, non-foamed functional composition is disposed directly on the foamed opacifying layer at a dry coverage of at least 0.5 g/m² and up to and including 15 g/m².

3. The method of claim 1, wherein the one or more (iv) water-soluble or water-dispersible organic polymeric binders includes a poly(vinyl alcohol), a partially hydrolyzed polyvinyl acetate, a cellulosic polymer, a poly(ethylene oxide), a poly(vinyl pyrrolidone), a fluorinated polymer, a polymer containing siloxane moieties, an acrylic polymer, an acrylamide polymer, gelatin or a gelatin derivative, gellan, a polysaccharide, a polyurethane, a polyester ionomer, or a combination of two or more of these materials.

4. The method of claim 1, wherein the applying step E) is carried out after the D) densifying step without intermediate steps.

5. The method of claim 1, wherein the foamed opacifying layer is embossed after the C) drying step and before the F) curing step.

6. The method of claim 1, wherein the applying step E) is carried out by spraying the non-foamed functional composition formulation that further comprises a coating aid, and the spraying is carried out using hydraulic pressure in a spray system to disperse drops of the non-foamed functional composition formulation, aided by nozzle pulsation.

7. The method of claim 1, further comprising forming an image or an embossed design on an outer surface of the foamed, opacifying element.

8. The method of claim 1, wherein the non-foamed functional composition formulation comprises all of the following (i), (ii), (iv), (v), (vi), and (vii) components, water, and hollow glass particles in an amount of at least 0.25 weight % and up to and including 20 weight % based on the total weight of the non-foamed functional composition formulation:

(i) untreated synthetic silica in an amount of at least 0.5 weight % and up to and including 10 weight %, based on the total weight of the non-foamed functional composition formulation;

a (ii) solid or non-solid lubricant;

one or more (iv) water soluble or water-dispersible organic polymeric binders, each having a glass transition temperature ($T_g$) below 25° C.;

a (v) crosslinking agent to crosslink the water-soluble or water-dispersible organic polymeric binder;

a (vi) thickener in an amount of at least 0.001 weight % and up to and including 10 weight %, based on the total weight of the non-foamed functional composition formulation; and a (vii) coating aid having a hydrophilic-lipophilic balance number of at least 5, present in an amount of at least 0.01 weight % and up to and including 5 weight %, based on the total weight of the non-foamed functional composition formulation, wherein the weight ratio of the (i) untreated synthetic silica to the one or more (iv) water-soluble or water-dispersible organic polymeric binders, is at least 10:1 and up to and including 1:1.

9. The method of claim 1, wherein the weight ratio of the (i) untreated synthetic silica to the one or more (iv) water-soluble or water-dispersible organic polymeric binders in the non-foamed functional composition, is at least 5:1 to and including 1:1.

10. The method of claim 1, wherein the (i) untreated synthetic silica is present in an amount of at least 1 weight % and up to and including 5 weight %, based on the total weight of the non-foamed functional composition formulation.

11. The method of claim 1, wherein the one or more (iv) water-soluble or water-dispersible organic polymeric binders in the non-foamed functional composition includes at least a fluorinated polyurethane.

12. The method of claim 1, wherein the (vii) coating aid is present in an amount of at least 0.01 weight % and up to and including 5 weight %, based on the total weight of the non-foamed functional composition formulation.

13. The method of claim 1, wherein the non-foamed functional composition further comprises hollow glass particles.

14. The method of claim 1, wherein the (i) untreated synthetic silica is precipitated silica or fumed silica.

15. The method of claim 1, wherein the continuous polymeric phase of the (a) porous particles comprises one or more cellulosic polymers, and the (b) binder material has a glass transition temperature of equal to or less than $-10°$ C.

16. The method of claim 1, wherein the (c) one or more additives comprises at least one foaming surfactant and at least one foam stabilizing agent.

17. The method of claim 1, wherein the non-foamed functional composition formulation is sprayed directly onto the foamed opacifying layer in a uniformly continuous manner.

18. The method of claim 1, wherein the non-foamed functional composition formulation further comprises glass particles in an amount of at least 0.25 weight % and up to and including 20 weight %, based on the total weight of the non-foamed functional composition formulation, the glass particles having an average particle size of at least 5um and up to and including 40 μm, and a density of at least 0.1 g/cm$^3$ and up to and including 2.2 g/cm$^3$.

* * * * *